United States Patent [19]
Fukuda et al.

[11] Patent Number: 5,491,514
[45] Date of Patent: Feb. 13, 1996

[54] CODING APPARATUS, DECODING APPARATUS, CODING-DECODING APPARATUS FOR VIDEO SIGNALS, AND OPTICAL DISKS CONFORMING THERETO

[75] Inventors: Hideki Fukuda, Kadoma; Masahiro Honjo, Sakai; Hideaki Shibata, Osaka, all of Japan

[73] Assignee: Matsushita Electric Industrial Co., Ltd., Kadoma, Japan

[21] Appl. No.: 188,140

[22] Filed: Jan. 27, 1994

[30] Foreign Application Priority Data

| Jan. 28, 1993 | [JP] | Japan | 5-012286 |
| Jul. 14, 1993 | [JP] | Japan | 5-174068 |
| Oct. 4, 1993 | [JP] | Japan | 5-247893 |
| Oct. 14, 1993 | [JP] | Japan | 5-256844 |

[51] Int. Cl.$^6$ .................................................. H04N 7/26
[52] U.S. Cl. ............................................ 348/397; 348/390
[58] Field of Search ........................... 348/390, 397; H04N 7/13, 7/26

[56] References Cited

U.S. PATENT DOCUMENTS

4,268,861  5/1981  Schreiber ................................ 348/397
5,089,917  2/1992  Kanota ..................................... 375/101

*Primary Examiner*—Howard W. Britton
*Attorney, Agent, or Firm*—Ratner & Prestia

[57] ABSTRACT

A coding and decoding apparatus is used to code and decode video signals. Input video signals are enhanced by an emphasis circuit having a nonlinear characteristic increasing an enhancement degree as amplitude of the input video signal decreases. The enhanced video signal, outputted from the emphasis circuit, is compression coded in an encoder and a code stream, representing a compression coded video signal, is outputted from the encoder. The code stream is transmitted to a decoder and the decoder decodes the code stream, outputting a decoded video signal. The decoded video signal is fed to a de-emphasis circuit having a nonlinear characteristic increasing a suppression degree as amplitude of the input signal decreases. As a result, low noise high quality video signals is reproduced from the de-emphasis circuit.

19 Claims, 16 Drawing Sheets

CODING APPARATUS, DECODING APPARATUS, CODING-DECODING APPARATUS FOR VIDEO SIGNALS, AND OPTICAL DISKS CONFORMING THERETO

FIELD OF THE INVENTION

The present invention relates to coding apparatus, decoding apparatus, coding-decoding apparatus for video signals, and optical disk conforming thereto, useful for transmission, recording and reproduction of video signals.

BACKGROUND OF THE INVENTION

As the coding means of video signals, at the present, it is general to employ the transform coding method of dividing a picture into blocks composed of adjacent plural pixels, and transforming each block orthogonally by discrete cosine transform or the like. In this method, the transform coefficient is quantized with a specific quantization step size, and compression coded by using variable length code such as Hafman code.

In coding moving pictures such as television signals, interframe coding utilizing the correlation between frames is effected. In interframe coding, the object frame is predicted, regarding the frame before or after the frame to be coded in time as the reference frame, the predicted error signal is coded and transmitted or recorded. Interframe prediction is effected in each block composed of plural pixels, and the motion quantity of each block is detected to compensate the motion. Therefore, the motion quantity of each block is transmitted or recorded together with the predicted error signal.

As the decoding processing means of code streams, as far as coded and processed by using transform coding method reproduced video signals may be obtained by transforming reversely. In the case of interframe predictive coding by using specified reproduced frame already obtained by decoding processing as reference frame, a reproduced frame is composed of decoded predicted error signal, motion quantity, and reference frame.

However, as the rate of compression becomes higher, coding noise becomes obvious, and in particular in the case of transform coding block noise and mosquito noise are generated to lead to deterioration of picture quality.

SUMMARY OF THE INVENTION

It is hence a primary object of the invention to present coding apparatus, decoding apparatus, coding-decoding apparatus for video signals, and optical disks suited to them, being effective for reducing coding noise to deteriorate the picture quality, generated in the compressing and coding process of video signals.

A preferred mode of the invention comprises:

emphasis means possessing a nonlinear characteristic of increasing the signal enhancement along with decrease of amplitude of Input video signal, and capable of setting the signal enhancement at a desired value and issuing the video signal by enhancing, coding means for issuing a code stream of compression coding the output signal from the emphasis means, decoding means for decoding the code stream and determining a decoded video signal, and de-emphasis means capable of varying the relative signal suppression degree to the signal enhancement in the emphasis means, possessing a nonlinear characteristic of increasing the signal suppressing degree along with decrease of amplitude of input signal, and reproducing a video signal by suppressing the decoded video signal.

Other specific purposes and effects of the invention will be better understood and appreciated from the following detailed description taken in conjunction with the drawings.

DESCRIPTION OF THE PREFERRED EMBODIMENTS

First is described a case of handling video signals as digital signals. For the sake of simplicity, the signal emphasis processing and signal suppression processing are explained as processing in the horizontal direction of the screen in two-dimensional video signals.

Figure 1:
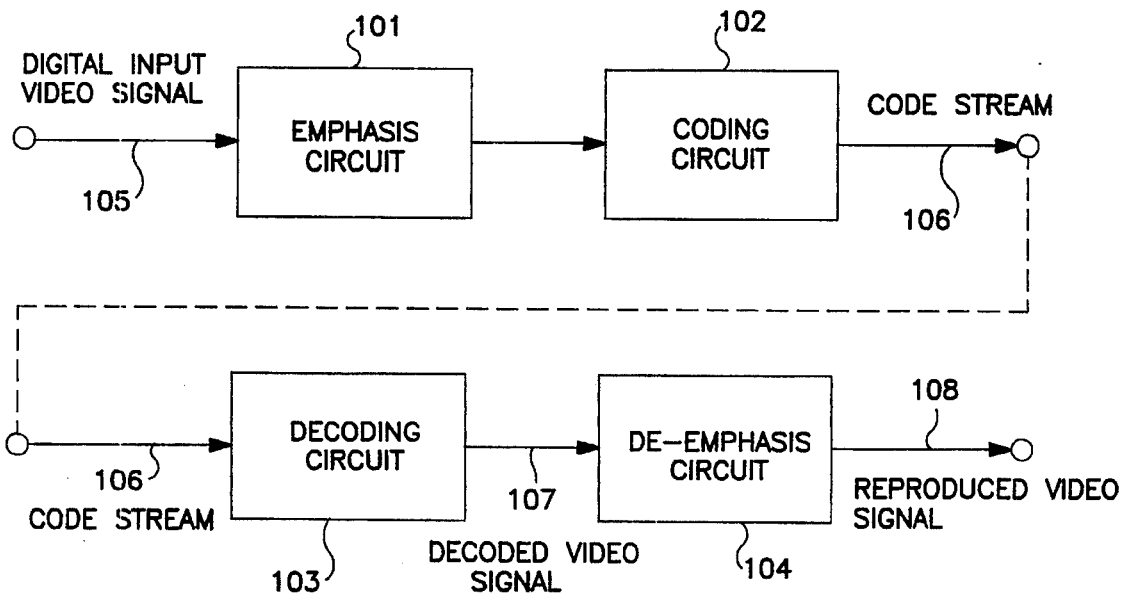
FIG. 1 is a block diagram of a video signal coding and decoding apparatus in first, second, third and fourth embodiments of the invention.

FIG. 1 shows a first embodiment of a picture coding and decoding apparatus of the invention. The coding and decoding apparatus in FIG. 1 comprises an emphasis circuit 101, a coding circuit 102, a decoding circuit 103, and a de-emphasis circuit 104.

A digital input video signal 105 is enhanced by a specified enhancement degree in the emphasis circuit 101, and coded in the coding circuit 102, and a code stream 106 is obtained. The code stream 106 represents a compression coded video signal. A decoding circuit 103 decodes the code stream 106, and issues a decoded video signal 107. The de-emphasis circuit 104 suppresses the decoded video signal 107 by a specified suppression degree, and issues a reproduced video signal 108.

By suppressing the decoded video signal, the noise generated by coding process is removed, but by enhancing the original signal prior to coding, deterioration of the original signal due, to signal suppression can be prevented.

As a second embodiment of the picture coding and decoding apparatus of the invention, the emphasis circuit 101 and de-emphasis circuit 104 in FIG. 1 are supposed to be in a complementary relation in the following explanation. That is, the product of the transmission function of the emphasis circuit 101 and the transmission function of the de-emphasis circuit 104 is 1.

Figure 2A:
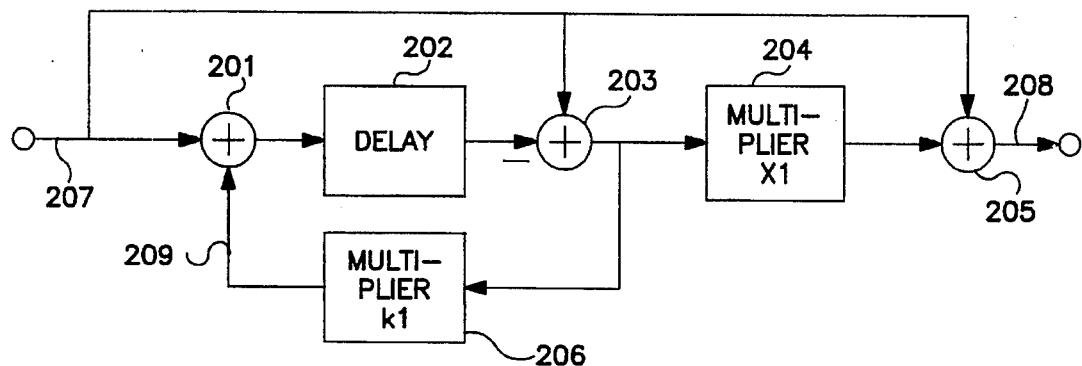
FIGS. 2(a) and 2(b) are block diagrams of an emphasis circuit and a de-emphasis circuit respectively in the second and third embodiments of the invention.

An example of the emphasis circuit 101 is shown in FIG. 2(a). The emphasis circuit in FIG. 2(a) comprises a first adder 201, a delay 202, a subtracter 203, a first multiplier 204, a second adder 205, and a second multiplier 206.

The adder 201 in FIG. 2(a) is for adding an input signal 207 and a feedback loop signal 209, and the output of the adder 201 is delayed by one pixel in the delay 202. The subtracter 203 subtracts the output of the delay 202 from the input signal 207. The output of the subtracter 203 is fed to the first multiplier 204 and the second multiplier 206. The first multiplier 204 is to multiply a constant x1 to the output of the subtracter 203. The second multiplier 206 multiplies a constant k1 to the output of the subtracter 203. The output of the second multiplier 206 is fed into the first adder 201 as a feedback loop signal 209. The output of the first multiplier 204 is fed into the second adder 205. The second adder 205 adds the output of the first multiplier 204 and the input signal 207, and its output becomes an output signal 208 of the emphasis circuit.

To simplify the description, herein, supposing the constant k1 in the second multiplier 206 to be 0 and assuming there is no feedback loop, this emphasis circuit is to multiply the difference from one pixel before by x1 times to add to the input signal, thereby enhancing the signal.

Figure 2B:
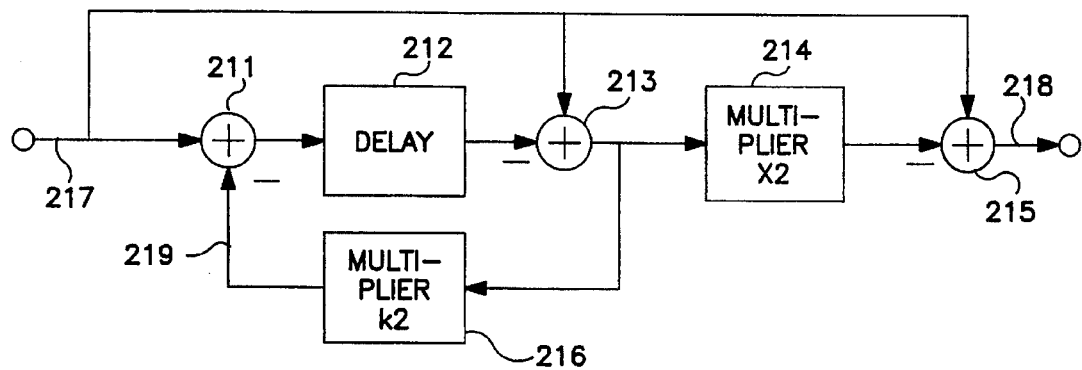

An example of de-emphasis circuit having a complementary characteristic to the emphasis circuit in FIG. 2(a) is shown in FIG. 2(b). The de-emphasis circuit in FIG. 2(b) comprises a first subtracter 211, a delay 212, a second subtracter 213, a first multiplier 214, a third subtracter 215, and a second multiplier 216.

The first subtracter 211 subtracts a feedback loop signal 219 from an input signal 217. The delay 212 delays the output of the first subtracter 211 by one pixel. The second subtracter 213 subtracts the output of the delay 212 from the Input signal 217. The output of the second subtracter 213 is fed to the first multiplier 214 and second multiplier 216. The first multiplier 214 multiplies the output of the second subtracter 213 by a constant x2. The second multiplier 216 multiplies the output of the second subtracter 213 by a constant k2. The output of the second multiplier 216 is fed to the first subtracter 211 as feedback loop signal 219. The output of the first multiplier 214 is fed to the third subtracter 215. The third subtracter 215 subtracts the output of the first multiplier 214 from the input signal 217, and its output becomes an output signal 218 of the de-emphasis circuit 104.

In order that the emphasis circuit in FIG. 2(a) and the de-emphasis circuit in FIG. 2(b) be in a complementary relation, it is enough to satisfy the condition in formula (1).

$$\left.\begin{array}{l} k2 = (x1 - k1)/(1 + x1) \\ x2 = x1/(1 + x1) \end{array}\right\} \quad (1)$$

For example, in the case of x1=1, k1=0, it results in x2=0.5, k2=0.5, and the frequency characteristic has its peak at fs/2 (fs: sampling frequency), and signal enhancement and signal suppression at maximum of about 9.5 dB are achieved.

The delay 202 and delay 212 are to delay the time by one pixel, but it is also possible to delay by two pixels. In this case, the frequency characteristic of the emphasis circuit and de-emphasis circuit possesses the peak around fs/4. Thus, the signal is not enhanced in the high frequency component (near fs/2). This is because the more coding noise may be generated by enhancing the high frequency component in the case of an original image containing many high frequency components.

By thus composing, the signal enhancement and signal suppression are complementary, and therefore the enhanced signal is returned to the original signal before the signal is enhanced by signal suppression, and only the coding noise components generated by coding process are suppressed. Therefore, the coding noise is decreased, and the picture quality is improved.

In a third embodiment of the invention, the degree of enhancement of the emphasis circuit 101 in FIG. 1 is set smaller than the degree of suppression of the de-emphasis circuit 104. Therefore, the signal suppression acts stronger, and mismatching occurs.

When the higher frequency components of signals are enhanced in the signal enhancement, the enhanced components are suppressed more in the signal suppression, and hence deterioration occurs in the higher frequency components as compared with the original signal. However, since the noise generated by higher frequency components by coding signal is removed more, the picture quality is improved by causing such mismatching in the case of high coding compression rate.

In FIG. 2(a) and 2(b), as x1 and k1 increase, the degree of enhancement of the emphasis circuit increases, and as x2 and k2 increase, the degree of suppression of the de-emphasis circuit increases. Parameters x1, k1, x2, k2 for equalizing the degree of enhancement of the emphasis circuit in FIG. 2(a) and the degree of suppression of the de-emphasis circuit in FIG. 2(b) should satisfy the conditions in formula (1).

Therefore, the parameters x1. k1 for making the degree of enhancement smaller than the degree of suppression may be enough if at least one of these parameters is smaller than the parameter determined in formula (1). For example, when x1=0.5, k1=0, it should be as follows: x2=0.5, k2=0.5.

By thus composing, the signal suppression becomes larger than the signal enhancement, the suppressed signal does not return to the original signal, but the coded signal generated by coding process is suppressed more. Therefore, the coding noise is reduced, and the picture quality is improved.

In the delay 202 of the emphasis circuit in FIG. 2(a) and the delay 212 of the de-emphasis circuit in FIG. 2(b), it is possible to delay by one pixel to set the peak frequency of the frequency gain characteristic around fs/2, or delay by two pixels to set the peak frequency around fs/4.

It is also possible to have the peak frequency of the frequency gain characteristic of the emphasis circuit around fs/4, and the peak frequency of the frequency gain characteristic of the de-emphasis circuit around fs/2. This is achieved by delaying two pixels by the delay 202 of the emphasis circuit in FIG. 2(a), and delaying one pixel by the delay 212 of the de-emphasis circuit in FIG. 2(b). Thus, the signal suppression acts strongly in high frequency components of the original signal, and the high frequency components of the original signal are sacrificed, but the coding noise generated by coding process can be removed more, so that the picture quality may be improved. On the other hand, in the low frequency region and medium frequency region, it is enough when nearly complementary characteristics are obtained, and the coding noise can be removed more efficiently.

The coding circuit 102 and decoding circuit 103 in the first and second embodiments are to compression, encode and regenerate the input video signals, and the known art such as discrete cosine transform coding method may be employed. The emphasis circuit and de-emphasis circuit are not limited to the circuit constitution shown in FIG. 2(a) and 2(b) alone.

A fourth embodiment of the invention is described below. In the fourth embodiment of the invention, the emphasis circuit 101 in FIG. 1 is replaced by an emphasis circuit having a nonlinear characteristic for enhancing the signal with a smaller degree as the signal amplitude becomes larger and the de-emphasis circuit 104 in FIG. 1 is replaced by a de-emphasis circuit having a nonlinear characteristic for suppressing the signal with a smaller degree as the signal amplitude becomes larger. First is explained a case in which the signal enhancement and signal suppression are complementary.

When a signal with a large signal amplitude is enhanced at a large degree, it gives rise to increase of information quantity of image signal, and more coding noise may be generated. Accordingly, by providing the signal amplitude with a nonlinear characteristic, the signal components having a similar amplitude to the generated noise components are enhanced and suppressed with a large degree, and the increase of information quantity is suppressed for large amplitude signal, so that the coding noise may be removed efficiently.

Same as in the second embodiment, meanwhile, the frequency gain characteristic of the emphasis circuit and de-emphasis circuit may have a peak around fs/2, or around fs/4. By having the gain peak around fs/2, the coding noise generated in the high frequency range of the frequency band may be removed substantially. Or, by having the gain peak around fs/4 the enhancement of high frequency components of the original signal may be weakened, and generation of coding noise may be suppressed.

Or, same as in the third embodiment, the degree of enhancement of the emphasis circuit may be set smaller than the degree of suppression of the de-emphasis circuit. As a result, the decoded video signal may be suppressed more, and the coding noise generated by the coding process can be removed more, thereby improving the picture quality.

Moreover, the frequency gain characteristic of the emphasis circuit may possess the peak around fs/4 and the frequency characteristics of the de-emphasis circuit may possess the peak around fs/2. As a result, the signal suppression in high frequency range of the frequency band acts stronger than the signal enhancement, and therefore the generated coding noise may be removed more in the high frequency range. In particular, without sacrificing the signal components in the low and medium frequency range, so that the picture quality may be improved.

Figure 3A:
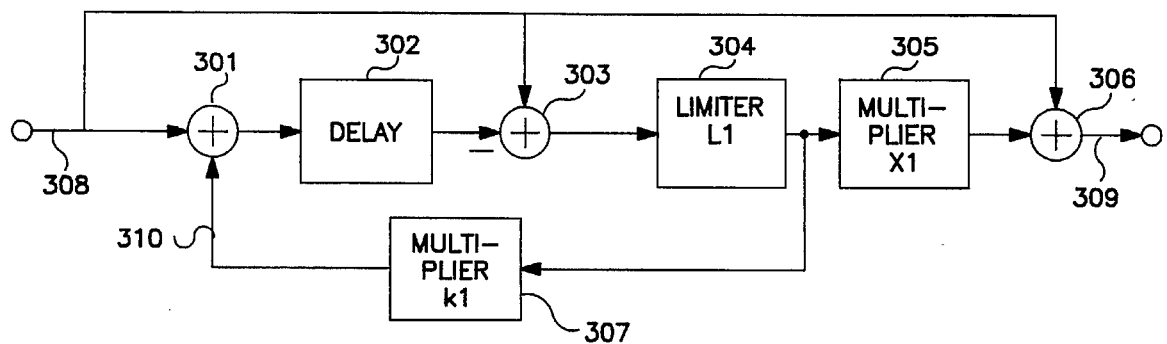
FIG. 3(a) and 3(b) are block diagrams of a nonlinear emphasis circuit and a nonlinear de-emphasis circuit respectively in fifth and sixth embodiments of the invention.
Figure 3B:
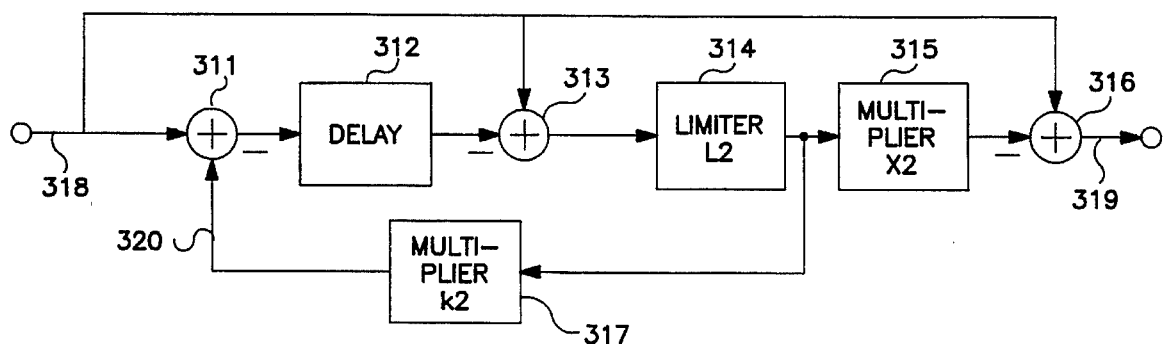

A fifth embodiment of the invention is described by referring to FIG. 3(a) and 3(b). FIG. 3(a) shows an example of an emphasis circuit nonlinear to the amplitude of input signal. The nonlinear emphasis circuit in FIG. 3(a) comprises a first adder 301, a delay 302, a subtracter 303, a limiter 304, a first multiplier 305, a second adder 306, and a second multiplier 307. The first adder 301 is for adding an input signal 308 and a feedback loop signal 310, and the output of the adder 301 is delayed by one pixel in the delay 302. The subtracter 303 subtracts the output of the delay 302 from the input signal 308. The output of the subtracter 303 corresponds to the high frequency components of the input signal.

Figure 4:
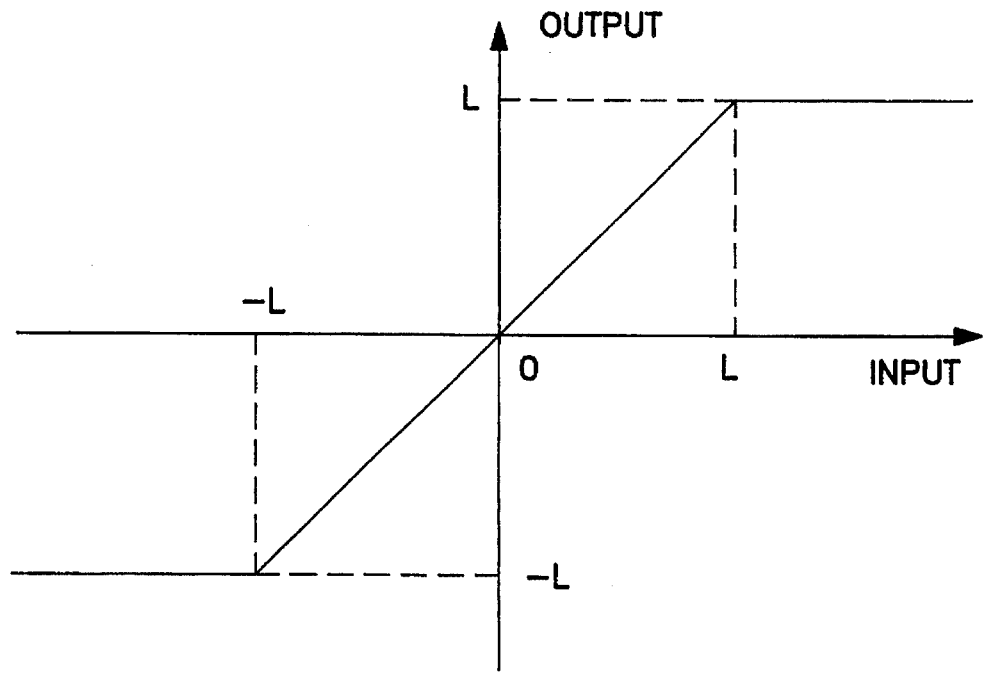
FIG. 4 is an input, output characteristic diagram of a limiter circuit in a fifth embodiment of the invention.

The limiter 304 limits the amplitude of the output signal of the subtracter 303 at a limiter level L1. The input and output characteristics of this limiter 304 are shown in FIG. 4. In FIG. 4, however, the limiter level is L. As shown in FIG. 4, while the amplitude of the input signal is from −L to L, the output signal is equal to the input signal. However, when the amplitude of the input signal is −L or less, the amplitude of the output signal is limited to −L, and when the amplitude of the input signal is L or more, the amplitude of the output signal is limited to L.

The output of the limiter 304 is fed to the first multiplier 305 and second multiplier 307. The first multiplier 305 multiplies the output of the limiter 304 by constant x1. The second multiplier 307 multiplies the output of the limiter 304 by constant k1. The output of the second multiplier 307 is fed to the first adder 301 as feedback loop signal 310. The output of the first multiplier 301 is fed to the second adder 306. The second adder 306 sums up the output of the first multiplier 305 and the input signal 308, and its output becomes an output signal 309 of the nonlinear emphasis circuit.

For the sake of simplicity of description, herein, the constant k1 in the second multiplier 307 is supposed to be 0. That is, assuming there is no feedback loop, when the limiter level L1 is infinite, this circuit is equivalent to FIG. 2(a) in which the difference from the signal one pixel before is multiplied by x1 times to be added to the input signal, thereby working as a linear emphasis circuit. However, by setting the limiter level L1 at a proper value, the signal enhancement degree to the small amplitude signal is larger than the signal enhancement degree, so that a nonlinear characteristic may be obtained.

An example of nonlinear de-emphasis circuit having a complementary characteristic to the nonlinear emphasis circuit shown in FIG. 3(a) is given in FIG. 3(b). The nonlinear de-emphasis circuit in FIG. 3(b) comprises a first subtracter 311, a delay 312, a second subtracter 313, a limiter 314, a first multiplier 315, a third subtracter 316, and a second multiplier 317.

The first subtracter 311 subtracts a feedback loop signal 320 from an input signal 318. The delay 312 delays the output of the first subtracter 311 by one pixel. The second subtracter 313 subtracts the output of the delay 312 from the input signal 318. The output of the second subtracter 313 corresponds to the high frequency component of the input signal 318.

The limiter 314 limits the amplitude of the second subtracter 313 at a limiter level L2. This limiter 314 is similar to the limiter 304 of the nonlinear emphasis circuit in FIG. 3(a) and its input and output characteristics are as shown In FIG. 4.

The output of the limiter 314 is fed into the first multiplier 315 and second multiplier 317. The first multiplier 315 multiplies the output of the limiter 314 by constant x2. The second multiplier 317 multiplies the output of the limiter 314 by constant k2. The output of the second multiplier 317 is fed into the first subtracter 311 as a feedback loop signal 320. The output of the first multiplier 315 is fed into the third subtracter 316. The third subtracter 316 subtracts the output of the first multiplier 315 from the input signal 318, and its output becomes the output signal 319 of the nonlinear de-emphasis circuit.

Herein, the limiter level L2 of the limiter 314 is defined by the limiter level L1 of the limiter 304 of the nonlinear emphasis circuit and the constant x1 of the multiplier 305 The limiter level L2 is expressed in formula (2).

$$L2=(1+x1) \times L1 \qquad (2)$$

For the signal of sufficiently smaller amplitude than the limiter level, in order that the nonlinear emphasis circuit in FIG. 3(a) and the nonlinear de-emphasis circuit in FIG. 3(b) may be in complementary relation, same as in the case of FIG. 2(a) and 2(b), it is enough to satisfy the condition of formula (1). Furthermore, when formula (2) is satisfied, complementary characteristics may be provided for all signals.

Incidentally, since the increase of signal enhancement degree causes to increase the information quantity of the signal, the coding noise increases in the compression coding process, which may possibly induce deterioration of picture quality. Therefore, basically, it is better when the signal enhancement degree is smaller from the viewpoint of coding efficiency. However, by signal suppression complementary to signal enhancement, the coding noise is removed, and the picture quality is improved. Accordingly, by setting the limiter level L1 of the limiter 304 of the nonlinear emphasis circuit at a proper value, the signal may be enhanced with a stronger degree for the signal of small amplitude similar to the amplitude of the noise component, and by suppressing the signal enhancement of signal of large amplitude, increase of information quantity can be suppressed, so that the coding noise included In the small amplitude signal can be removed.

For example, in the case of the constants of circuits as follows, with the maximum signal amplitude at 256 level.

$x1=1.0, k1=0$ $x2=0.5, k2=0.5$ the limiter level L1 of the limiter 304 of the nonlinear emphasis circuit, and the limiter level L2 of the limiter 314 of the nonlinear emphasis circuit may be set as follows.

$L1=15, L2=30$

These limiter levels are, however, experimentally obtained examples, and these are not limitative. However, since the noise level of the coding noise such as block noise generated by coding process is often 30 or less, the coding noise can be removed efficiently by setting at L2=30.

In FIG. 3(a) and 3(b), the delay 302 and the delay 303 are designed to delay by one pixel, and the peak frequency of the frequency gain characteristic is around fs/2, but it is also possible to delay by two pixels. At this time, the peak frequency of the gain is around fs/4.

The nonlinear emphasis circuit and nonlinear de-emphasis circuit may be constituted as shown in FIG. 3(a) and 3(b), but it is not limitative, and any other arbitrary circuits may be used as far as the emphasis circuit and de-emphasis circuit possess a nonlinear characteristic so that the degree of enhancement and suppression becomes smaller as the amplitude becomes larger.

Besides, same as in the third embodiment, the degree of enhancement of the emphasis circuit may be set smaller than the degree of suppression of the de-emphasis circuit, and more coding noise is removed in coding at high compression rate, so that the picture quality may be improved. In this case, in the emphasis circuit and de-emphasis circuit in FIG. 3(a) and 3(b), the parameters x1, k1, L1 for setting the degree of enhancement smaller than the degree of suppression may be set smaller than the parameters determined in the formulas (1) and (2), in at least one of the three parameters.

Similar to the third embodiment, in the frequency gain characteristic of the emphasis circuit and de-emphasis circuit, the peak frequency may be set at fs/2. or fs/4. Furthermore, the peak frequency of frequency gain characteristic of the emphasis circuit may be set at fs/4, and the peak frequency of the de-emphasis circuit at fs/2.

The nonlinear emphasis circuit and nonlinear de-emphasis circuit as shown in FIG. 3(a) and 3(b) may be used, but it is not limitative and any other arbitrary circuits may be used as far as the emphasis circuit and de-emphasis circuit possess a nonlinear characteristic so that the degree of enhancement becomes smaller as the amplitude becomes larger.

As a sixth embodiment of the invention, in the nonlinear emphasis circuit and nonlinear de-emphasis circuit in FIG. 3(a) and 3(b), the limiter level L1 is supposed to be smaller than L1 satisfied the condition in formula (2), although the parameters x1 and k1 of the emphasis circuit satisfy the conditions of formula (2). At this time, the limiter level of the emphasis circuit is supposed to be Li, then the value of L21 obtained in $$L2=(1+x1) \times L1 < L2$$

shows the limiter level of the de-emphasis circuit in which the degree of emphasis and degree of suppression are equal to each other in the case of the limiter level of L1 of the emphasis circuit. In this case, L2 is the limiter level of the de-emphasis circuit in the case of setting the degree of enhancement smaller than the degree of suppression.

When the amplitude of the input signal of the de-emphasis circuit is L2 or less, the degree of enhancement and degree of suppression are equal to each other, and the emphasis circuit and the de-emphasis circuit come to have a complementary relation. However, when the amplitude of the input signal of the de-emphasis circuit exceeds L2, the degree of suppression becomes larger than the degree of enhancement. That is, in a flat pattern having a small signal amplitude, the signal enhancement and the signal suppression have a complementary relation, but in a complicated pattern with a larger signal amplitude, the degree of enhancement is smaller than the degree of suppression.

When a complicated pattern is enhanced, the increase of information quantity becomes larger than in the flat pattern, and the coding noise increases, but by thus composing, the degree of enhancement in a complicated pattern can be suppressed, and the signal can be enhanced without giving rise to increase of information quantity. Besides, in a flat pattern, since the signal enhancement and signal suppression are in complementary relation, only the coding noise is removed. On the other hand, in the complicated pattern, since the degree of suppression is stronger than the degree of enhancement, the high frequency components of the original signal are sacrificed, but the noise generated in high frequency components by coding process can be removed more, so that the picture quality may be improved.

The emphasis circuit and de-emphasis circuit shown in FIG. 3(a) and 3(b) can be used, but they are not limitative, and the emphasis circuit having nonlinear characteristic decreasing in the signal enhancement degree as the amplitude increases, or an emphasis circuit having linear characteristic may be used, and any other arbitrary circuits may be used as far as the emphasis circuit and de-emphasis circuit are in complementary relation when the signal amplitude is less than a specified amount and the signal suppression acts stronger than the signal enhancement when the signal amplitude is larger than the specified amount.

In the foregoing first to sixth embodiments, the signals are enhanced or suppressed in the horizontal direction of two-dimensional picture signals, but not limited to this, it is the same in the vertical direction of the picture or in the time direction. When processing in the vertical direction of the screen, in interlaced picture, it is possible to process in each field or in each frame.

Figure 5A:
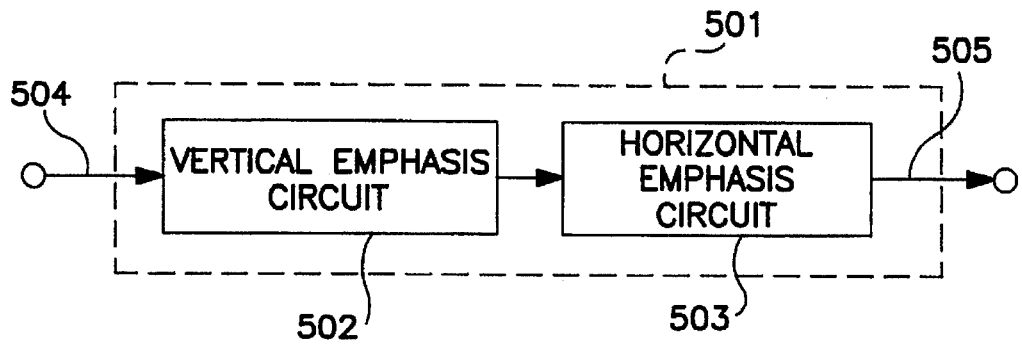
FIG. 5(a) and 5(b) are block diagrams of an emphasis circuit and a de-emphasis circuit respectively in seventh and eighth embodiments of the invention.
Figure 5B:
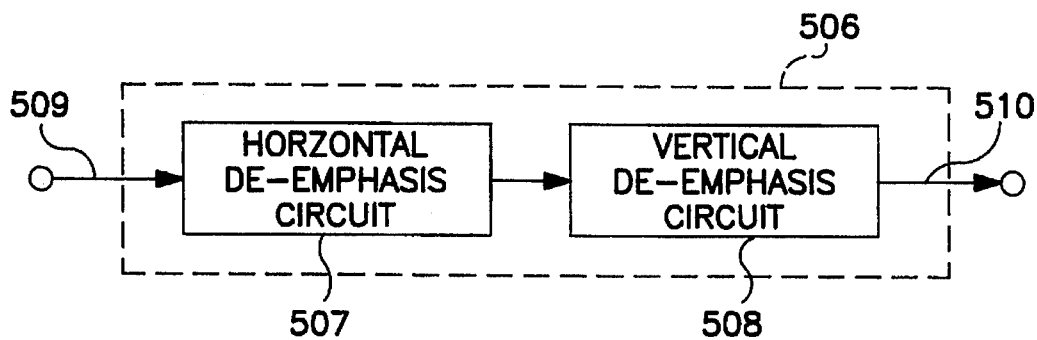

In a seventh embodiment of the invention shown below, a two-dimensional emphasis circuit 501 in FIG. 5 (a) is used as an example of the emphasis circuit 101 in FIG. 1 and a two-dimensional de-emphasis circuit 506 in FIG. 5(b) is used as an example of de-emphasis circuit 104 in FIG. 1.

The two-dimensional emphasis circuit 501 in FIG. 5(a) is composed of a vertical emphasis circuit 502 and a horizontal emphasis circuit 503, and the two-dimensional de-emphasis circuit 506 in FIG. 5(b) is composed of a horizontal de-emphasis circuit 507 and a vertical de-emphasis circuit 508. Each circuit configuration is same as the emphasis circuit In FIG. 2(a) or FIG. 3(a), or the de-emphasis circuit in FIG. 2(b) or FIG. 3(b). However, the signal enhancement degree in the horizontal direction must be set larger than the signal enhancement degree in the vertical direction. Furthermore, in the seventh embodiment, the connection sequence of the vertical emphasis circuit 502 and the horizontal emphasis circuit 503 may be reverse to the order shown in the diagram. Likewise, the connection sequence of the horizontal de-emphasis circuit 507 and vertical de-emphasis circuit 508 is not limited to the shown order, and may be in a reverse sequence.

In coding process, when the image is divided into blocks consisting of plural pixels and each block is coded, as the coding compression rate becomes higher, the block noise becomes obvious, and the picture quality deteriorates extremely. This block noise is a result of appearance of discontinuity among blocks in the block boundary, and the discontinuity in the horizontal direction is particularly obvious. That is, it occurs as line noise in the boundary of blocks in the vertical direction. To remove such discontinuity in the horizontal direction more effectively, it is desired to increase the signal enhancement degree in the horizontal direction, rather than the signal enhancement degree in the vertical direction.

For example, when the nonlinear emphasis circuit in FIG. 3(a) is used in the vertical emphasis circuit 502 and horizontal emphasis circuit 503, and the nonlinear de-emphasis circuit in FIG. 3(b) in the horizontal de-emphasis circuit 507 and vertical de-emphasis circuit, by selecting the constants x1, k1, L1, x2, k2, L2 as shown in Table 1, the signal suppression degree is about 9.5 dB at maximum in the horizontal direction, and about 5.5 dB in the vertical direction, and the block noise can be removed efficiently.

TABLE 1

|  | Emphasis | | | De-emphasis | | |
|---|---|---|---|---|---|---|
|  | x1 | k1 | L1 | x2 | k2 | L2 |
| Horizontal direction | 1.5 | 0.0 | 6 | 0.6 | 0.6 | 30 |
| Vertical direction | 0.43 | 0.0 | 10 | 0.3 | 0.3 | 30 |

As the emphasis circuits and de-emphasis circuits, the circuits shown in FIG. 3(a) and 3(b) can be used, but they are not limitative, and the emphasis circuit having nonlinear characteristic to decrease the signal enhancement degree as the amplitude increases or the emphasis circuit having linear characteristic may be used. The constants shown in Table 1 are experimentally obtained examples, and are not definitive.

The horizontal and vertical emphasis circuits and horizontal and vertical de-emphasis circuits may be in mutually complementary relation, and the enhancement degree of the horizontal and vertical emphasis circuit may be smaller than the suppression degree of the horizontal and vertical de-emphasis circuit, respectively. Or the enhancement degree of either horizontal direction or vertical direction only may be set smaller than the suppression degree. At this time, the other direction should be equal in enhancement degree and suppression degree.

In an eighth embodiment of the invention, same as in the seventh embodiment, the two-dimensional emphasis circuit 501 in FIG. 6(a) is used as an example of the emphasis circuit 101 in FIG. 1, and the two-dimensional de-emphasis circuit 506 in FIG. 5(b) as an example of the de-emphasis circuit 104 In FIG. 1. The eighth embodiment comprises same circuits as the seventh embodiment, but the connection condition is different from the seventh embodiment. That is, the vertical emphasis circuit is first provided, and it is constituted so as to enhance the input signal in the vertical direction in the first place.

In thus composed embodiment, the operation is described below. In the two-dimensional emphasis circuit 501 in FIG. 5(a), first, an input video signal 504 is enhanced in the vertical direction by the vertical emphasis circuit 502. The output of the vertical emphasis circuit 502 is enhanced in the horizontal direction by the horizontal emphasis circuit 503. The output signal 505 of the horizontal emphasis circuit 503 is coded and decoded as explained in the first embodiment. The decoded signal 509 is fed into the two-dimensional de-emphasis circuit 606. First, the signal is suppressed in the horizontal direction by the horizontal de-emphasis circuit 507, and is then suppressed in the vertical direction by the vertical de-emphasis circuit 508. The output of the vertical de-emphasis circuit 508 is produced as a reproduced video signal 510.

As the signal enhancement degree increases, overflow or underflow of signal amplitude is likely to occur, and mismatching between the emphasis circuit and de-emphasis circuit increases and noise occurs. Therefore, by performing the signal enhancement in the vertical direction small in signal enhancement in the first place, occurrence of overflow or underflow of signal amplitude may be decreased. As a result, mismatching between signal enhancement and signal suppression decreases, and noise due to signal enhancement or signal suppression may be decreased.

The emphasis circuits and de-emphasis circuits may be those shown in FIG. 2(a) and 2(b) and FIG. 3(a) and 3(b), or different ones.

Figure 6:
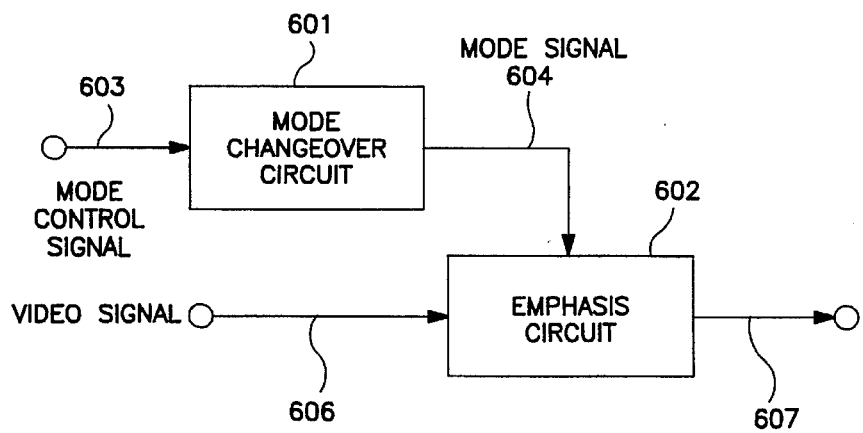
FIG. 6 is a block diagram of part of ninth and tenth embodiments of coding and decoding apparatus of the invention.

Referring now to FIG. 6, a ninth embodiment of the invention is described below. FIG. 6 is an explanatory diagram of an example of coding and decoding apparatus possessing plural modes, comprising a mode selector 601 in the coding and decoding apparatus shown in FIG. 3.

The mode changeover circuit 601 issues a mode signal 604 depending on a mode control signal 603 for controlling plural modes. The emphasis circuit 602 issues an output by enhancing a video signal 606 by the signal enhancement degree depending on the mode signal 604. The enhanced signal 607 is fed into a coding circuit as explained in the first embodiment, and is coded.

If the signal enhancement degree is too high, the information quantity of the signal 607 entering the coding circuit increases, and more coding noise may be generated in coding process, which may cause deterioration of picture quality. Besides, in order to keep complementary relation with signal suppression process in the apparatus for decoding, the characteristic of the signal enhancement must be adjusted to the decoding apparatus. In such plural modes, by changing the signal enhancement process, efficient compression coding is realized.

For example, when recording a code stream obtained by compression coding of video signal into a medium, the signal enhancement is conducted depending on the mode for recording in a medium that can be both recorded and reproduced, and the mode for recording in the medium that can be reproduced only. In the apparatus possessing only the means for decoding process without means for coding process, the signal suppression degree for reproducing the video signal from the medium is determined definitely by the signal enhancement degree when recording. On the other hand, in the apparatus comprising both coding process and decoding process, the signal enhancement degree can be freely selected when recording. Thus, the signal enhancement degree can be varied by the mode depending on the type of the medium, so that coding process may be done efficiently.

In this embodiment, incidentally, it is assumed that the de-emphasis circuit for suppressing the signal is in complementary relation to the emphasis circuit in all modes.

The peak frequency of the frequency gain characteristic of the emphasis circuit and de-emphasis circuit may be defined depending on each mode, or the maximum gain may be defined depending on each mode.

As a tenth embodiment of the invention, the enhancement degree of the emphasis circuit in at least one mode in FIG. 6 is set smaller than the suppression degree of the de-emphasis circuit. Herein, the number of modes is supposed to be three.

The mode changeover circuit 601 issues a mode signal 604 depending on a mode control signal 603 for controlling three modes. The emphasis circuit 602 issues an output by enhancing a video signal 606 by the enhancement degree depending on the mode signal 804. The enhanced signal 607 is fed into a coding circuit as explained in the first embodiment, and is coded.

At the reproduction side, the de-emphasis circuit suppresses the video signal decoded by the suppression degree depending on the mode signal. Herein, the enhancement degree in three modes is not set larger than the suppression degree, and the enhancement degree is set smaller than the suppression mode in at least one mode. For example:

Mode 1: enhancement degree=suppression degree
Mode 2: enhancement degree<suppression degree
Mode 3: enhancement degree=suppression degree
Mode 1 enhancement<Mode 2 enhancement<Mode 3 enhancement Mode 1 suppression<Mode 2 suppression=Mode 3 suppression as the signal enhancement degree becomes too high, the information quantity of signal 607 entering the coding circuit increases, and the coding noise generated in coding process increases, which may result in deterioration of picture quality. Therefore, mode 3 is generally selected to enhance and suppress signals, and mode 1 is selected in the case of coding process with less coding noise generation. Furthermore, mode 2 is selected in the case the coding noise is increased by signal enhancement.

By varying the signal enhancement process depending on such plural modes, efficient compression coding may be realized.

In the above example of modes, the suppression degree of de-emphasis circuit is same in mode 2 and mode 3, but it is not limitative.

Among the plural modes, there may be a mode not effecting signal enhancement and signal suppression, or a mode effecting signal suppression only and not effecting signal enhancement.

The enhancement degree of the emphasis circuit is determined by the mode signal, but the suppression degree of the de-emphasis circuit may be set constant, regardless of the mode signal. In this case, the suppression degree may be equal to the greatest enhancement degree. Thus, the circuit scale can be reduced without requiring control by mode signal at the reproducing means side.

Instead of three modes, two or any more modes may be incorporated, and the example of modes is not limitative.

In the ninth and tenth embodiments, the mode may be selected in each block by comprising means for dividing a picture into blocks composed of plural pixels.

The unit of changing over the modes may be each screen, or may be each specified time by incorporating a counting circuit for issuing a detection signal in every specified time.

Moreover, the modes may be changed over in every scene change by incorporating a circuit for detecting a scene change. The method of detecting a scene change may be realized by measuring the correlation between pictures, but it is not limitative, and any arbitrary means may be employed.

Figure 7:
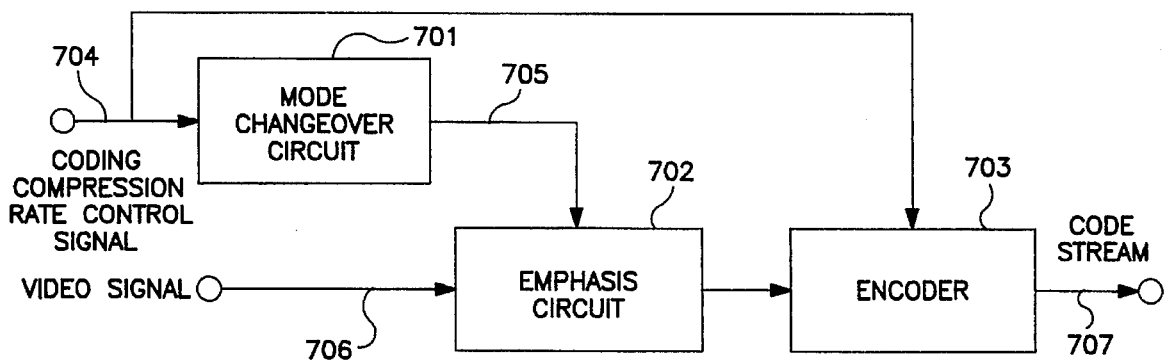
FIG. 7 is a block diagram of part of eleventh and twelfth embodiments of coding and decoding apparatus of the invention.

An eleventh embodiment of the invention is described below while referring to FIG. 7. Same as the ninth embodiment, FIG. 7 is an explanatory diagram of an example of coding and decoding apparatus for coding at plural coding compression rates, by incorporating a mode selector 701, in the coding and decoding apparatus as shown in FIG. 1.

The mode changeover circuit 701 issues a mode signal 705 depending on a coding compression rate control signal 704. The emphasis circuit 702 enhances a video signal 706 by the signal enhancement degree depending on the mode signal 705. An encoder 703 encodes the output signal of the emphasis circuit 702 at the coding compression rate depending on the coding compression rate control signal, and issues a code stream 707.

In this example of coding and decoding apparatus, signal enhancement and signal suppression are in complementary relation, and when the coding compression rate is low, the signal enhancement degree is decreased, and as the coding compression rate becomes higher, the signal enhancement degree is increased. When the coding compression rate is low, coding noise is small by nature, and it is not necessary to increase the signal enhancement degree and signal suppression degree. However, as the coding compression rate becomes higher block noise is generated, and the picture quality deterioration becomes obvious, and therefore the coding noise must be removed more positively.

Generally, as the signal enhancement degree is increased, the information quantity increases, but the increase of coding noise due to increase of information quantity and the coding noise removed by signal suppression are traded off, and it is preferred to decrease the signal enhancement degree if the coding noise is small from the beginning. Hence, by adaptively enhancing the signal depending on the coding compression rate and suppressing the signal according to the signal enhancement, the coding noise can be decreased efficiently, so that the picture quality may be improved.

Incidentally, the de-emphasis circuit for signal suppression process may be in complementary relation with the emphasis circuit 702, but not limited to this, in a certain mode, the suppression degree of the de-emphasis circuit may be larger than the enhancement degree of the emphasis circuit.

As a twelfth embodiment of the invention, an example of coding and decoding apparatus having a mode in which the signal enhancement degree is smaller than the signal suppression degree is explained in FIG. 7. FIG. 7 is an explanatory diagram of an example of coding and decoding apparatus for coding at plural coding compression rates, by incorporating a mode changeover circuit 701, in the coding and decoding apparatus shown in FIG. 1, same as in the eleventh embodiment. Herein, three coding compression rates are set, and mode 1, mode 2 and mode 3 are defined as follows.

Mode 1 compression>Mode 2 compression>Mode 3 compression

A coding compression rate control signal 704 is a control signal for determining three types of compression rate. The mode changeover 701 issues a mode signal 705 depending on the coding compression control signal 704. The emphasis circuit 702 enhances a video signal 706 by the signal enhancement degree depending on the mode signal 705. An encoder 703 encodes the output signal of the emphasis circuit 702 by the coding compression rate depending on the coding compression rate control signal, and issues a code stream 707.

In this example of coding and decoding apparatus, when the coding compression rate is low, the signal enhancement degree is decreased, and when the coding compression rate becomes high, the signal enhancement degree is increased. While the coding compression rate is low, the coding noise is small by nature, and it is not necessary to increase the signal enhancement degree or signal suppression degree. However, as the coding compression rate is raised, block noise is generated, and picture quality deterioration becomes obvious, and hence the coding noise must be removed more positively.

For example, the enhancement degree and suppression degree in each mode are determined as follows.

Mode 1 enhancement>Mode 2 enhancement>Mode 3 enhancement

Mode 1 suppression>Mode 2 suppression>Mode 3 suppression

In each mode, however, the enhancement degree is not set larger than the suppression degree, and the enhancement degree must be set smaller than the suppression degree in at least one mode. For example, the following conditions must be satisfied.

Mode 1 enhancement<Mode 1 suppression
Mode 2 enhancement=Mode 2 suppression
Mode 3 enhancement=Mode 3 suppression Generally, as the signal enhancement degree increases, the information quantity increases, but the increase of coding noise due to increase of information quantity and the coding noise removed by signal suppression are traded off, and it is preferred to decrease the signal enhancement degree if the coding noise is small from the beginning. Hence, by adaptively enhancing the signal depending on the coding compression rate and suppressing the signal according to the signal enhancement, the coding noise can be decreased efficiently, so that the picture quality may be improved. Furthermore, in mode 1 (high compression rate mode), since the enhancement degree is set smaller than the suppression degree, the high frequency component of the original signal is sacrificed, but the coding noise generated in the high frequency components can be removed more, so that the picture quality is improved.

By thus constituting, the coding noise can be removed efficiently, adaptively to the coding compression rate.

Incidentally, by setting mode 1 and mode 2 as follows, the signal suppression of the de-emphasis circuit becomes two modes.

Mode 1 enhancement<Mode 2 enhancement
Mode 1 suppression=Mode 2 suppression

In the mode of low compression rate (mode 3), signal enhancement and signal suppression may not be required.

The number of modes is not limited to three.

Meanwhile, the number of modes of coding compression rate, the number of modes of signal enhancement, and the number of modes of signal suppression may be either same or different.

When setting the enhancement degree smaller than the suppression degree, as the coding compression rate increases, the enhancement degree may be decreased (or the suppression degree may be increased), and the mismatching of signal enhancement and signal suppression may be increased. In this example, when the suppression degree of the de-emphasis circuit is constant, in the high compression rate mode, the enhancement degree is set smaller than the suppression degree, and in the low compression rate mode, the enhancement degree and suppression degree are set equal. Thus, in the low compression rate mode, since the emphasis circuit and de-emphasis circuit are in complementary relation, only the coding noise can be removed without sacrificing the original signal. On the other hand, in the high compression rate mode, since the signal suppression acts stronger than the signal enhancement, the original signal may be sacrificed, but the coding noise is removed more, so that the picture quality may be improved.

Figure 8:
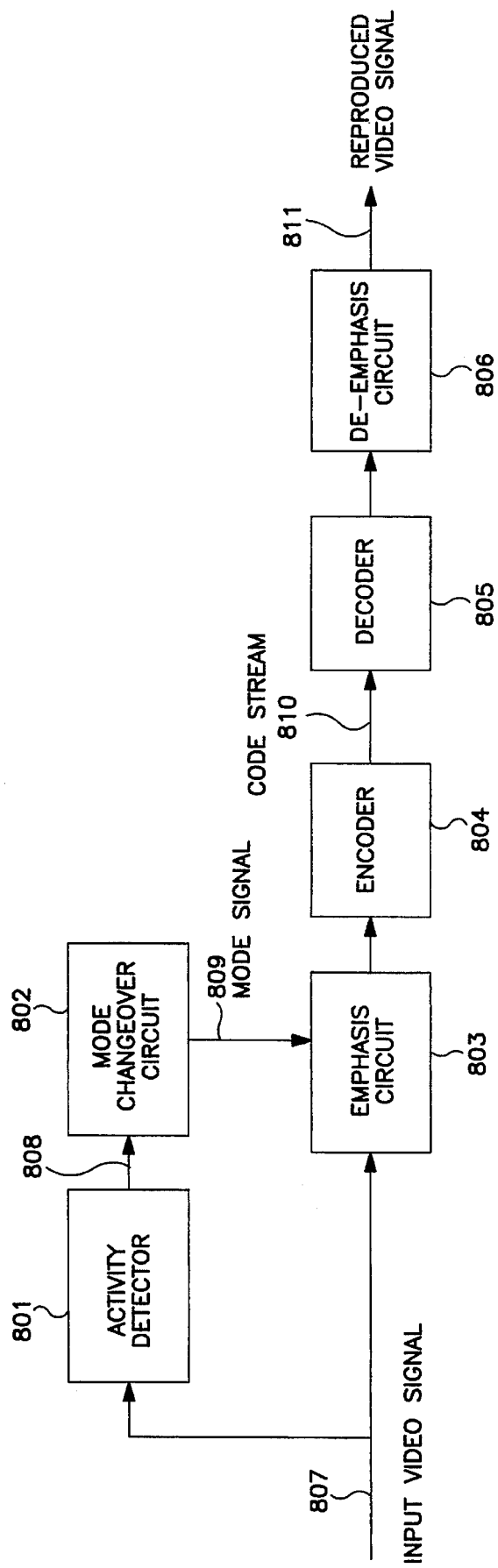
FIG. 8 is a block diagram of a thirteenth embodiment of coding and decoding apparatus of the invention.

Successively, a thirteenth embodiment of the invention is described with reference to FIG. 8. FIG. 8 is an explanatory diagram of an example of coding and decoding apparatus having an activity detector 801 and a mode changeover circuit 802 installed in a coding and decoding apparatus as shown in FIG. 1.

The activity detector 801 is to detect and issue activity 808 of a video signal 807. The detected activity 808 is fed into the mode changeover circuit 802, and a mode signal 809 depending on activity is issued. An emphasis circuit 803 enhances the video signal 807 by the signal enhancement degree depending on the mode signal 809. The enhanced signal is coded in an encoder 804 same as in the first embodiment, and a code stream 810 is obtained. The code stream 810 is decoded in a decoder 805, and suppressed in a de-emphasis circuit 805 by the suppression degree depending on the enhancement degree of the emphasis circuit 803, and a reproduced video signal 811 is obtained.

The signal enhancement of the emphasis circuit 803 decreases as activity of the video signal increases. This is because the information quantity is large in the video signal with large activity, and hence more coding noise is generated in coding process when enhanced by a large enhancement degree. Thus, coding noise can be removed efficiently by determining the signal enhancement degree adaptively depending on activity.

As activity, variance of pixel level of pixels may be handled as activity. Variance of pixel level is calculated as shown in formula 3, assuming N pixel levels to be a1, a2, a3 ... aN. In formula 3, meanwhile m denotes the mean of N pixel levels calculated in formula 4.

$$[\text{Activity}] = \frac{1}{N} \sum_{i=1}^{N} (xi - m)^2 \quad (3)$$

$$m = \frac{1}{N} \sum_{i=1}^{N} xi \quad (4)$$

As activity, instead of variance of pixel levels as mentioned above, the sum of differences of pixel levels of adjacent pixels, or the sum of the differences from the mean may be used, or any other may be used as far as expressing activity of image.

Activity may be detected also in the block unit, by dividing the picture into blocks, or in the picture unit, or in a unit of plural pictures, incorporating a scene change detector, moreover, activity may be detected upon every scene change, and the signal may be enhanced depending on detected activity.

The de-emphasis circuit 806 for signal suppression process may be a circuit in a complementary relation with the emphasis circuit 803, or the suppression degree may be greater than the enhancement degree.

In a mode with larger suppression degree than enhancement degree, as activity increases, the enhancement degree is decreased (or the suppression degree is increased) so as to enlarge the difference between the enhancement degree and suppression degree. By thus setting, in coding at low compression rate, the frequency band of image may be sacrificed, but more coding noise can be removed, and the picture quality may be improved.

The enhancement degree is determined depending on the mode signal 809, but the degree of suppression may be constant regardless of the mode signal 809. In this case, the suppression degree may be equal to the greatest enhancement degree.

Figure 9:
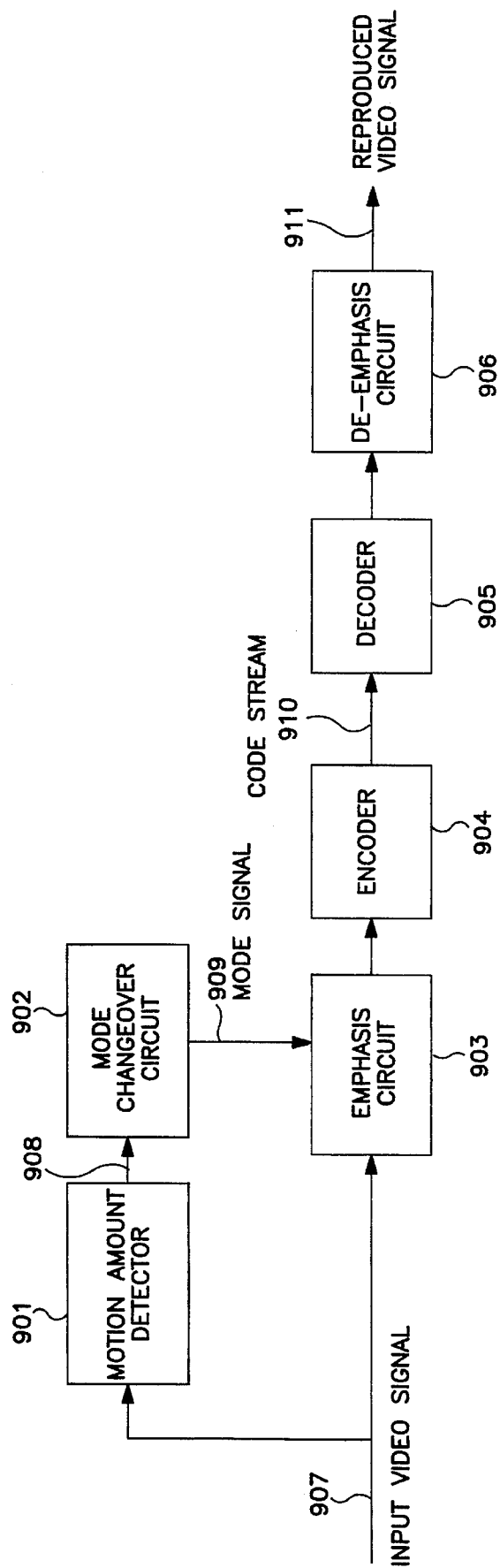
FIG. 9 is a block diagram of a fourteenth embodiment of coding and decoding apparatus of the invention.

Referring then to FIG. 9, a fourteenth embodiment of the invention is described below. FIG. 9 is an explanatory diagram of an example of coding and decoding apparatus having a motion amount detector 901 and a mode changeover circuit 902 installed in the coding and decoding apparatus as shown in FIG. 1.

The motion amount detector 901 detects the motion amount 908 of a video signal 907, and the mode changeover circuit 902 issues a mode signal 909 depending on the motion amount 908. An emphasis circuit 903 enhances the video signal 907 by the signal enhancement degree depending on the mode signal 909. The enhanced signal is coded in an encoder 904 same as in the first embodiment, and a code stream 910 is obtained. The obtained code stream 910 is decoded in a decoder 905, and suppressed in a de-emphasis circuit 906 by the suppression degree corresponding to the enhancement degree of the emphasis circuit 903, thereby obtaining a reproduced video signal 911.

The signal enhancement degree of the emphasis circuit 903 increases as the motion amount of the video signal increases. This is because the video signal with a large motion amount is large in the information quantity, and coding noise is likely to occur in coding process. Therefore, in the image with a large motion amount, the mode enhancing by a large signal enhancement degree is selected, and signal is suppressed according to the signal enhancement, so that coding noise may be reduced more positively. Thus, by adaptively determining the signal enhancement degree depending on the motion amount, coding noise can be removed efficiently.

The method of detection of motion amount is not limited, and any known method may be employed as far as the motion amount of video signal can be determined. For example, the picture may be divided into blocks, and motion amount may be detected in each block, or in the case of an interlaced image, the motion amount can be detected by investigating the correlation between lines.

The motion amount detection can be effected in the block unit by dividing the picture into blocks, or in the picture unit, or in the unit of plural pictures.

The de-emphasis circuit 906 for signal suppression process may be a circuit in a complementary relation with the emphasis circuit 903, or the suppression degree may be greater than the enhancement degree.

Besides, at least in one mode, the enhancement degree of the emphasis circuit nay be set smaller than the suppression degree of the de-emphasis circuit, but in other modes, the enhancement degree and suppression degree must be equal to each other. For example, in the mode of video signal with large motion amount, the enhancement degree is set smaller than the suppression degree. In the picture with large motion amount, generally, high frequency components are few, and deterioration of high frequency region of the original image by increasing the suppression degree is smaller, and the picture quality is improved by removing more coding noise included in the high frequency components.

In a mode with larger suppression degree than enhancement degree, as the motion amount increases, the enhancement degree is decreased (or the suppression degree is increased) so as to enlarge the difference between the enhancement degree and suppression degree. By thus setting, in coding at low compression rate, the frequency band of image may be sacrificed, but more coding noise can be removed, and the picture quality may be improved.

The enhancement degree is determined depending on the mode signal 909, but the degree of suppression may be constant regardless of the mode signal 909. In this case, the suppression degree may he equal to the greatest enhancement degree.

Figure 10:
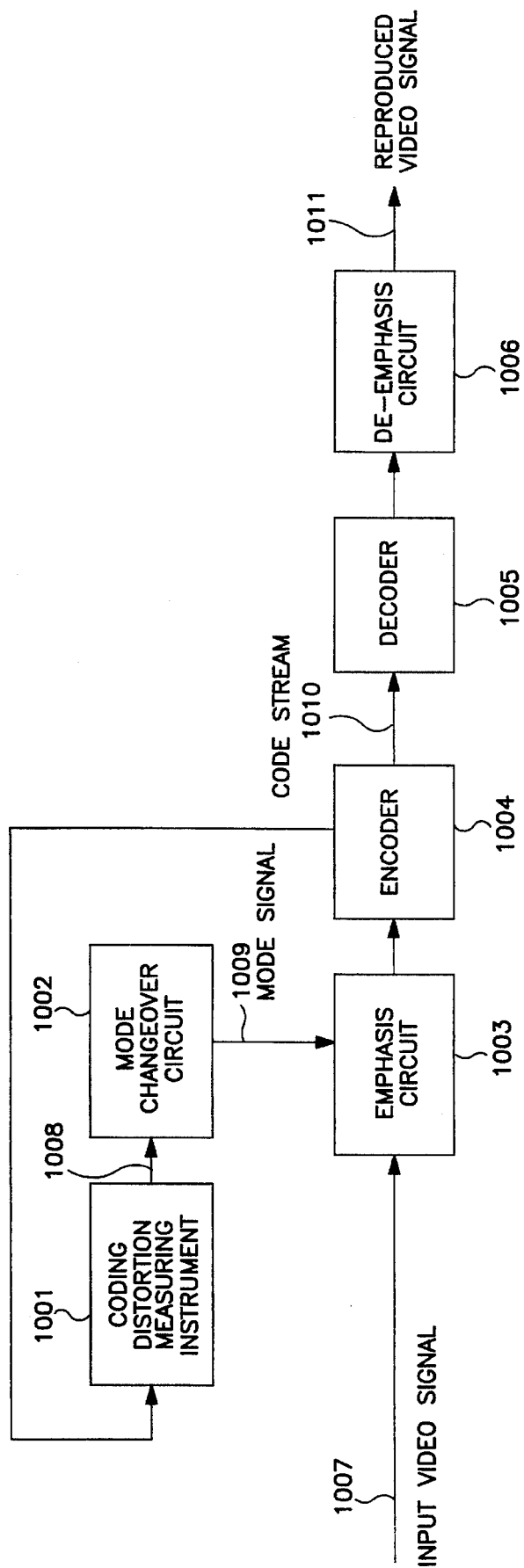
FIG. 10 is a block diagram of a fifteenth embodiment of coding and decoding apparatus of the invention.

Referring now to FIG. 10, a fifteenth embodiment of the invent ion is described below. FIG. 10 is an explanatory diagram of an example of coding and decoding apparatus having a coding distortion measuring instrument 1001 and a mode changeover circuit 1002 incorporated in a coding and decoding apparatus shown in FIG. 1.

The coding distortion measuring instrument 1001 is to measure and issue a coding distortion amount 1008 generated when coded by an encoder 1004. The mode changeover circuit 1002 issues a mode signal 1009 depending on the coding distortion 1008. An emphasis circuit 1003 enhances an video signal 1007 by the signal enhancement degree depending on the mode signal 1009. An encoder 1004 encodes the enhanced signal and issues a code stream 1010. The code stream 1010 is decoded in a decoder 1005, and is suppressed in a de-emphasis circuit 1006 by the suppression degree depending on the enhancement degree of the emphasis circuit 1003, thereby obtaining a reproduced video signal 1011.

When the coding noise amount is large, by selecting the mode enhancing by the large signal enhancement degree and suppressing the signal according to the signal enhancement, the coding noise can be removed more positively.

The de-emphasis circuit 1006 for signal suppression process may be a circuit in a complementary relation with the emphasis circuit 1003, or the suppression degree may be greater than the enhancement degree.

Besides, at least in one mode, the enhancement degree of the emphasis circuit may be set smaller than the suppression degree of the de-emphasis circuit, but in other modes, the enhancement degree and suppression degree must be equal to each other. For example, in the mode of video signal with large coding distortion amount, the enhancement degree is set smaller than the suppression degree. By increasing the suppression degree, the high frequency region of the original picture deteriorates, but coding noise included in high frequency components is removed more, so that the picture quality is improved.

In a mode with larger suppression degree than enhancement degree, as the coding distortion amount increases, the enhancement degree is decreased (or the suppression degree is increased) so as to enlarge the difference between the enhancement degree and suppression degree. By thus setting, in coding at low compression rate, the frequency band of image may be sacrificed, but more coding noise can be removed, and the picture quality may be improved.

The enhancement degree is determined depending on the mode signal 1009, but the degree of suppression may be constant regardless of the mode signal 1009. In this case, the suppression degree may be equal to the greatest enhancement degree.

As the measurement of coding distortion, the difference between the original signal and the signal after coding process may be measured, or any other means may be employed as far as the amount of coding distortion generated in the coding process may be expressed.

Or, the amount of coding distortion may be expressed by the quantization step size used in quantizing the signal in coding process. To control to specified coding compression rate in coding process, the quantization step size in quantizing is controlled depending on the generated code amount. That is, if the generated code amount is not much, the quantization step size is increased to suppress the code amount, and if the generated code amount is small, the quantization step size is decreased to control so that the code amount may be constant. As a result, the generated code amount increases, and if the quantization step size increases accordingly, the coding distortion increases.

By thus selecting the mode enhancing the signal by the signal enhancement degree depending on the quantization step size in quantizing and suppressing the signal according to the signal enhancement, the coding noise can be removed efficiently.

Figure 11:
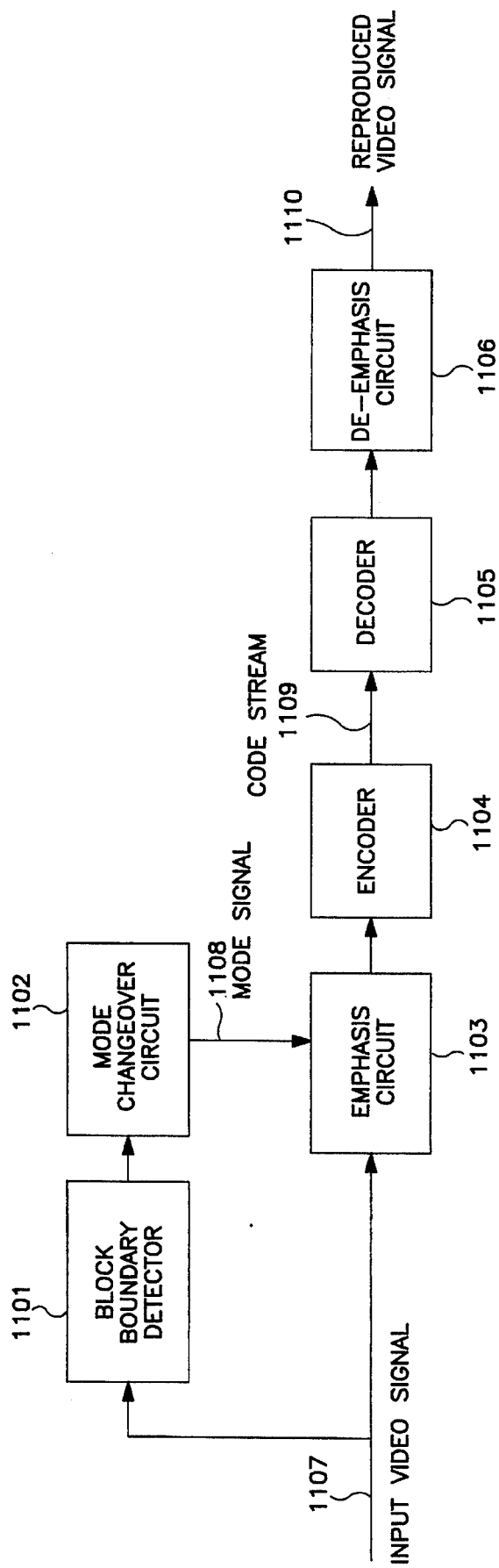
FIG. 11 is a block diagram of a sixteenth embodiment of coding and decoding apparatus of the invention.

A sixteenth embodiment of the invention is described below by reference to FIG. 11. FIG. 11 is an explanatory diagram of an example of coding and decoding apparatus having a block boundary detector 1101 and a mode changeover circuit 1102 installed in a coding and decoding apparatus as shown in FIG. 1. The coding process in this case is to perform coding process in each block by dividing the picture into blocks consisting of adjacent plural pixels.

The block boundary detector 1101 in FIG. 11 is to detect the boundary of blocks which is the unit of coding process in a video signal 1107. The mode changeover circuit 1102 issues a mode signal 1108 depending on the detection result of the block boundary detector 1101. An emphasis circuit 1103 issues an output by enhancing the video signal 1107 by the signal enhancement degree corresponding to the mode signal 1108. The enhanced signal is coded in an encoder 1104, and a code stream 1109 is obtained. The code stream 1109 is decoded in a decoder 1105, and is suppressed by the suppression degree depending on the enhancement degree of the emphasis circuit 1103 in a de-emphasis circuit 1106, and a reproduced video signal 1110 is obtained.

When coded in every block, as the coding compression rate becomes higher, the coding noise is generated as block noise, and the picture quality deteriorates extremely. This block noise is generated due to discontinuity among blocks. Therefore, the boundary of blocks is detected by the block boundary detector 1101, the mode enhancing by a great signal enhancing degree for the block boundary is selected, and the coding noise generated in the boundary of the blocks in particular due to signal suppression according to the signal enhancement is removed. As a result, the block noise can be decreased.

The enhancement degree on the block boundary may be set smaller than the suppression degree. Accordingly, it is possible to remove positively the coding noise generated in the block boundary, in particular, by a large signal suppression. Thus, the block noise can be decreased. However, in other than the block boundary, the enhancement degree and suppression degree should be equal to each other.

The enhancement degree is determined by the mode signal 1108, but the degree of suppression may be constant regardless of the mode signal 1108. The suppression degree in this case is equal to the enhancement degree in other than the block boundary.

Figure 13:
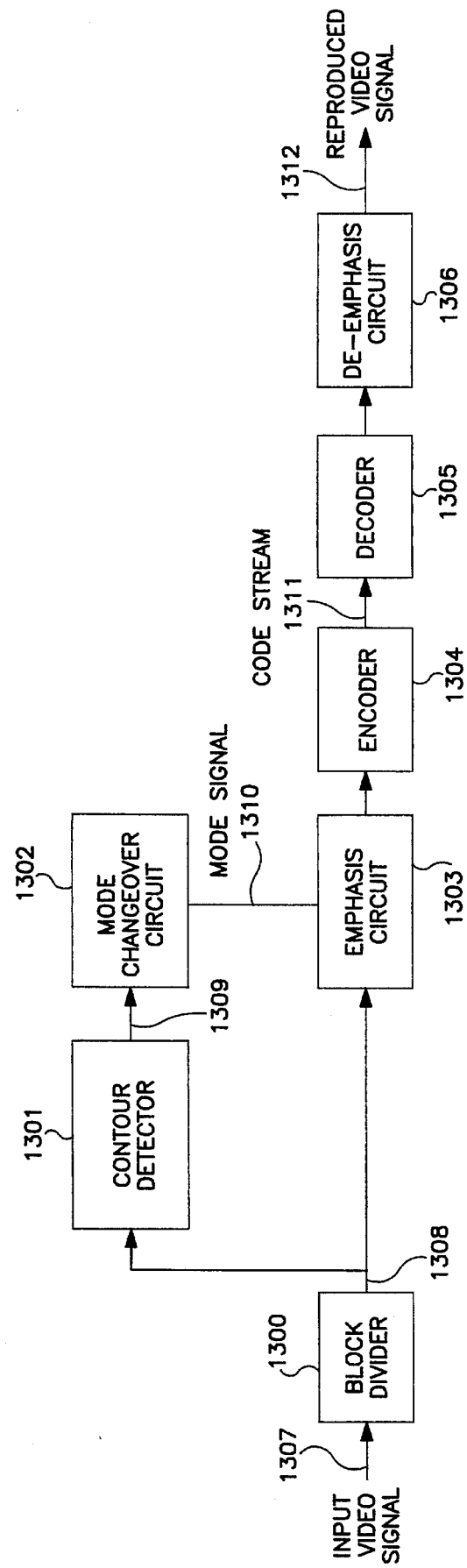
FIG. 13 is a block diagram of a seventeenth embodiment of coding and decoding apparatus of the invention.

FIG. 13 shows a seventeenth embodiment of the invention. FIG. 13 is an explanatory diagram of a coding and decoding apparatus comprising a block divider 1300, a contour detector 1301, a mode changeover circuit 1302, an emphasis circuit 1303, an encoder 1304, a decoder 1305, and a de-emphasis circuit 1306.

The block divider 1300 is to divide an input image 1307 into blocks 1308 consisting of plural pixels. The contour detector 1301 detects that the input block 1308 contains a contour, and issues a detection signal 1309. The mode changeover circuit 1302 issues a mode signal 1310 depending on the detection signal 1309. The emphasis circuit 1303 enhances the block 1308 by the signal enhancement degree depending on the mode signal 1310. The enhanced signal is coded in the encoder 1304 same as in the first embodiment, and a code stream 1311 is obtained. The code stream 1311 is decoded in the decoder 1305, and is suppressed in the de-emphasis circuit 1305, thereby obtaining a reproduced block 1312.

However, in other than the block containing the contour, the enhancement degree is set smaller than the suppression degree, and the mode signal 1310 is selected so that the enhancement degree in the block containing the contour may be equal to the suppression degree. As mentioned above, by setting the suppression degree larger than the enhancement degree, deterioration occurs in high frequency components. Deterioration of high frequency components in the contour induces a large deterioration of picture quality, and hence the mode is selected so that the enhancement degree of the emphasis circuit 1303 and the suppression degree of the de-emphasis circuit 1306 may be equal in the contour.

By thus composing, deterioration of the contour of the image can be decreased, and coding noise can be removed efficiently.

The method of detection of the contour is not limited, and any other method may be employed.

The block unit is not limited, but is free.

Figure 14:
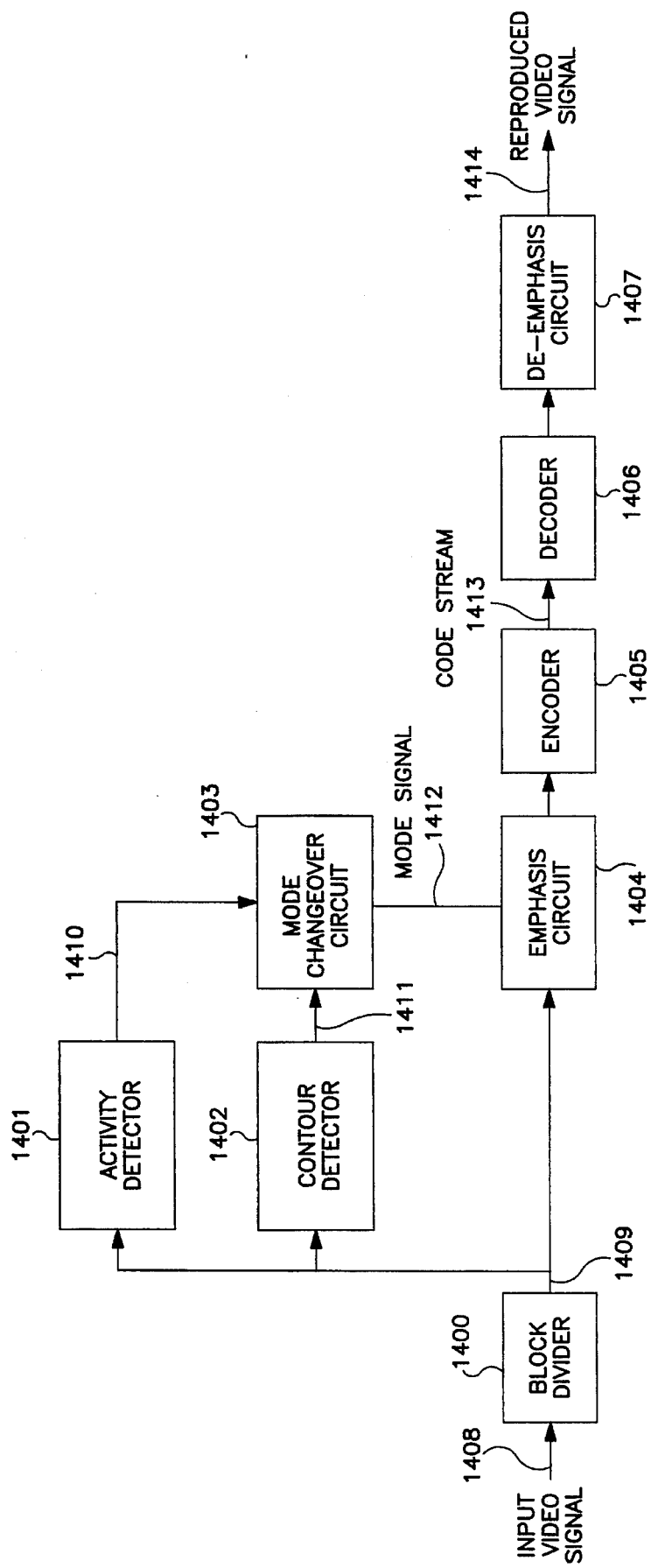
FIG. 14 is a block diagram of an eighteenth embodiment of coding and decoding apparatus of the invention.

Referring to FIG. 14, an eighteenth embodiment of the invention is described below. FIG. 14 is an explanatory diagram of an example of a coding apparatus comprising a block divider 1400, an activity detector 1401, a contour detector 1402, a mode changeover circuit 1403, an emphasis circuit 1404, and an encoder 1405, and a decoding apparatus comprising a decoder 1405 and a de-emphasis circuit 1407.

The block divider 1400 is to divide an input image 1408 into blocks 1409 consisting of plural pixels. The activity detector 1401 is to detect activity 1410 of a block 1409, same as in the thirteenth embodiment. The contour detector 1402 detects that the block 1409 contains a contour same as in the seventeenth embodiment, and issues a detection signal 1411. The mode changeover circuit 1403 issues a mode signal 1412 depending on the detected activity 1410 and detection signal 1411 of the contour. The emphasis circuit 1404 enhances the block 1409 by the enhancement degree depending on the mode signal 1412. The enhanced signal is coded in the encoder 1405, and a code stream 1413 is issued. The code stream 1413 is decoded in the decoder 1405, and is suppressed in the de-emphasis circuit 1407, thereby obtaining a reproduced signal 1414.

When activity of the block 1409 is larger than a specified value and does not include contour, the mode changeover circuit 1403 selects the mode so that the enhancement degree of the emphasis circuit 1404 may be smaller than the suppression degree of the de-emphasis circuit 1407. In other blocks, the enhancement degree and suppression degree are equal to each other.

As activity increases, the coding noise increases, and by setting the suppression degree larger than the enhancement degree, more coding noise can be removed. In the contour, however, activity is often large, and if the suppression degree is set larger than the enhancement degree, deterioration of contour due to signal suppression occurs, which is not preferred. Accordingly, by constituting as shown in FIG. 14, the enhancement degree can be set smaller than the suppression degree only in the image region large in activity in other than the contour, so that the coding noise can be removed efficiently without deteriorating the contour.

Meanwhile, the enhancement degree of the emphasis circuit 1404 is determined depending on the mode signal 1412, but the suppression degree of the de-emphasis circuit 1407 may be constant regardless of the mode signal 1412. In this case, the enhancement degree of the image region not in the contour large in activity is set smaller than the enhancement degree in other image regions, and the suppression degree is set equal to the greatest enhancement degree.

Activity may be detected in the same manner as in the thirteenth embodiment, but it is not limitative. Besides, the detecting method of the contour is not limited, and any other method may be employed as desired. The size of the block is not particularly defined.

It does not matter if the block size of the detection unit of activity and the block size of the detection unit of contour are different. For example, when detecting activity in a small block consisting of 8× 8 pixels, and the contour in a large block consisting of 16×16 pixels, the enhancement degree is determined in each small block, depending on activity as for the small blocks included in the large blocks not containing contours. In large blocks containing contours, the enhancement degree is determined in each large block.

Figure 15:
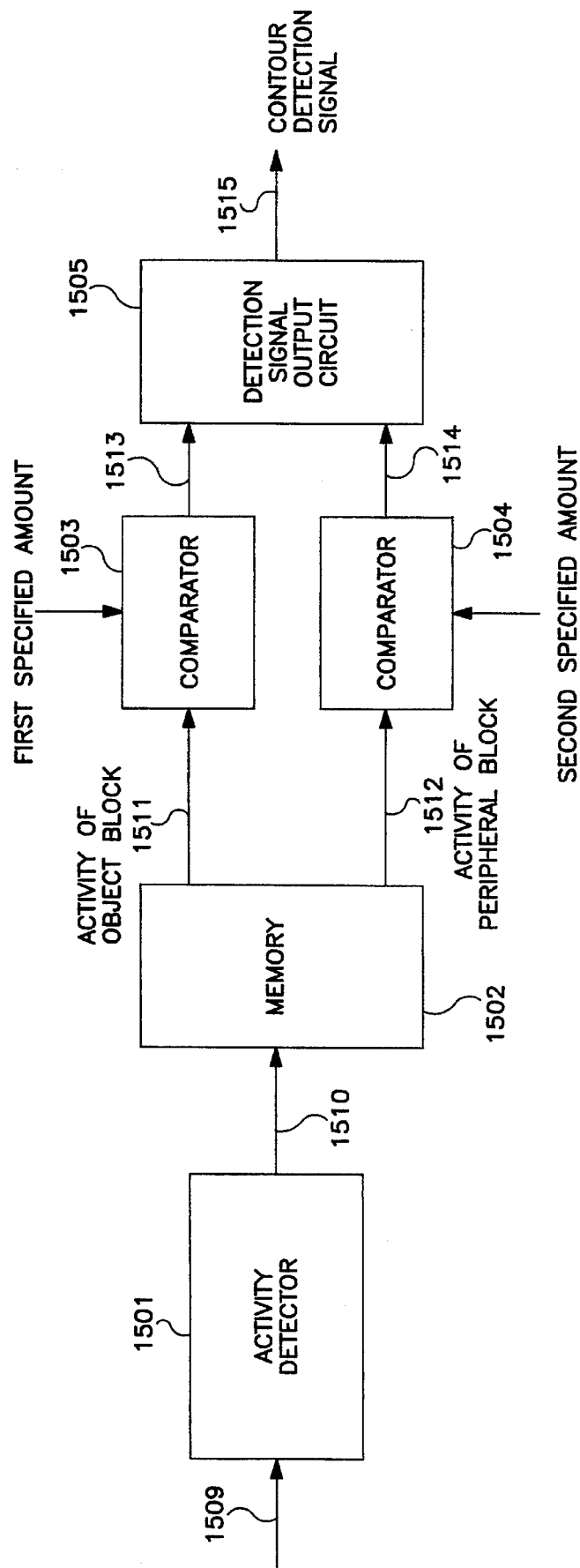
FIG. 15 is a block diagram of a nineteenth embodiment of coding and decoding apparatus of the invention.

A nineteenth embodiment of the invent ion is described in FIG. 15. FIG. 15 explains an example of contour detector in the seventeenth or eighteenth embodiment.

The contour detector in FIG. 15 comprises an activity detector 1501, a memory 1502, a first comparator 1503, a second comparator 1504, and a detection signal output circuit 1505.

The activity detector 1501 is to detect and issue an activity 1510 of an input block 1509 same as in the eighteenth embodiment. The memory 1502 stores activity 1510, and issues activity 1511 of an object block, and activity 1512 of the block positioned on the periphery of the object block. Herein, the peripheral block is four blocks positioned above, below, right and left of the object block. The first comparator 1503 compares activity 1511 of the object block and a first specified amount, and issues a comparison result 1513. The second comparator 1504 compares the activity 1512 of the peripheral block and a second specified amount, and issues a comparison result 1514. The detection signal output circuit 1505 issues a contour detection signal 1515, depending on the comparison result 1513 of the first comparator 1503 and the comparison result 1514 of the second comparator 1504.

The detection signal output circuit 1505 judges that the object block contains the contour when activity 1511 of the object block is larger than the specified amount and at least one of activities 1512 of the peripheral block is smaller than the specified amount, and issues a contour detection signal 1515. It makes use of the fact that activity of the contour is large, and it is intended to detect that the contour is adjacent to the flat pattern, in particular. By setting the suppression degree larger than the enhancement degree in the contour adjacent to the flat pattern, deterioration due to signal suppression increases. Accordingly, by setting the enhancement degree and suppression degree each to each other in the contour, as in the thirteenth or fourteenth embodiment, the coding noise is removed efficiently, and the picture quality is improved.

Figure 16:
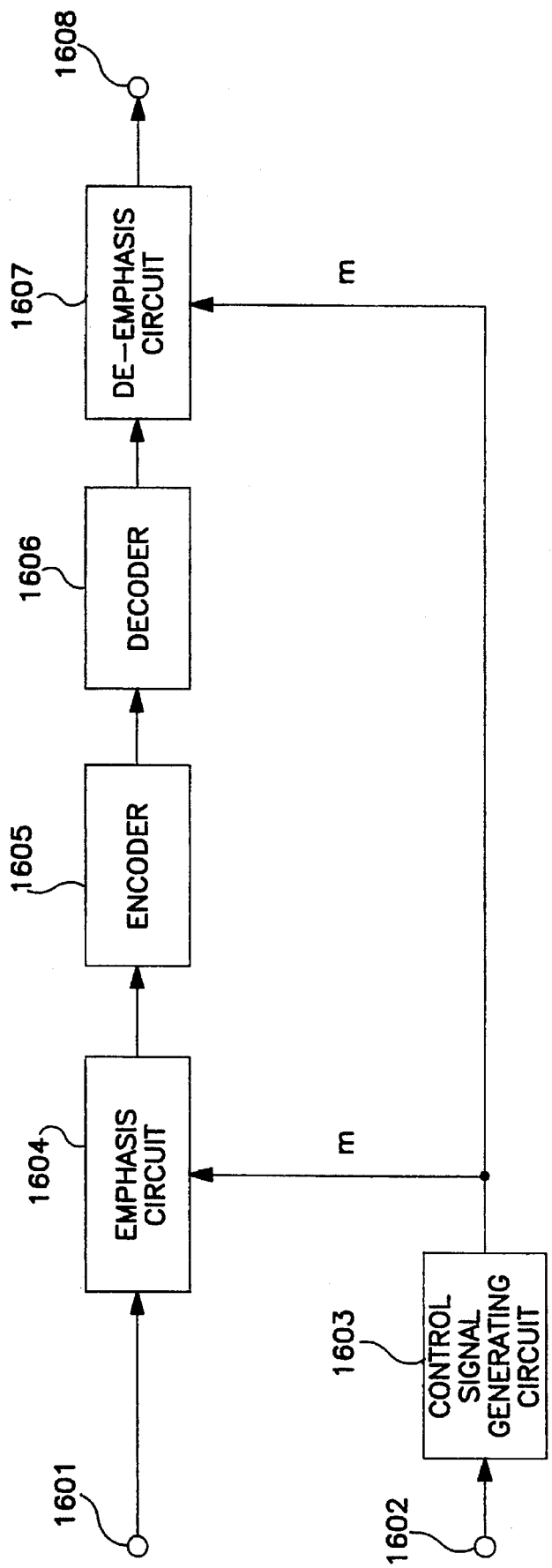
FIG. 16 is a block diagram of twentieth and twenty-first embodiments of coding and decoding apparatus of the invention.

FIG. 16 shows twentieth and twenty-first embodiments of coding and decoding apparatus of picture signals of the invention. In FIG. 16, numeral 1603 denotes a control signal generating circuit, which is composed of counters and decoders in horizontal and vertical directions. Numeral 1504 denotes an emphasis circuit possessing plural types of emphasis characteristic, being composed of high pass filter, multiplier, and adder. A constituent example is shown in FIG. 2(*a*).

Numeral 1605 is an encoder, and 1606 is a decoder. Numeral 1607 is a de-emphasis circuit possessing plural types of de-emphasis characteristic, being composed of high pass filter, multiplier and subtracter. A constituent example is shown in FIG. 2(*b*).

The operation is described in detail below while referring to FIG. 16. In an input terminal 1601, a digital image signal composed of three component signals is entered in synchronism with horizontal and vertical synchronizing signals and in time division multiplex. In other input terminal 1602, a clock for sampling the horizontal and vertical synchronizing signals and image signal is entered. The control signal generating circuit 1603 generates a two-bit mode control signal a for distinguishing three component signals individually on the basis of the clock for sampling the horizontal and vertical synchronizing signals and image signal, and issues the mode control signal m to the emphasis circuit 1604 and de-emphasis circuit 1607.

The emphasis circuit 1604 enhances the signal in every component of the digital image signal according to one of the plural types of emphasis characteristic selected by the mode control signal m. The encoder 1605 encodes the output of the emphasis circuit 1604, and issues a code stream. This code stream is usually sent to the transmission route, or is recorded in a recording medium. The decoder 1606 decodes the code stream, and issues the decoded image signal to the de-emphasis circuit 1607.

The de-emphasis circuit 1607 suppresses the signal in every component of the decoded image signal according to one of the plural types of de-emphasis characteristic selected by the mode control signal m, and a reproduced image signal is issued to the output terminal 1608. However, the emphasis characteristic of the emphasis circuit 1604 [selected by the mode control signal m] and the de-emphasis characteristic of the de-emphasis circuit 1607 selected by the mode control signal m are in complementary relation. That is, the product of their transmission functions is always 1.

Incidentally, selection of one of the plural types of characteristic according to the mode control signal m means changes of four coefficients (x1, k1, x2, k2) shown in FIG. 2(*a*) and 2(*b*) according to the mode control signal m. Luminosity of components for composing the image signal is known to be lowered in the sequence of G>R>B in the case of, for example, RGB signal. Therefore, by the ratio of luminosity of these components, the ratio of the emphasis amount and de-emphasis amount is determined, and the component of large luminosity is enhanced by a large degree, while the component of small luminosity is enhanced by a small degree, and it is possible to encode by arresting the increase of information amount due to unnecessary signal enhancement, so that the coding noise can be efficiently decreased by matching with the human visual property.

As explained herein, the embodiment is designed to enhance the signal according to the luminosity ratio in every one of three components of digital image signal, encode and decode, and suppress the signal by a characteristic complementary to signal enhancement, and therefore the enhanced signal is suppressed to return to the original signal before enhancement, and only the coding noise generated by coding process is suppressed, and therefore the coding noise is decreased and the picture quality is improved, and moreover an optimum decrease of coding noise corresponding to luminosity of each component is realized.

In the nonlinear characteristic to enhance and suppress by a small degree along with the increase of signal amplitude, a small amplitude signal about same as the amplitude of noise component is enhanced by a large degree, and by arresting the enhancement of large amplitude signal, increase of information quantity can be arrested, and coding noise included in the small amplitude signal can be removed.

The circuit configuration of the emphasis circuit and de-emphasis circuit is not limited to FIGS. 2(*a*) and 2(*b*) alone, but it is enough when the signal enhancement and signal suppression are in a complementary relation, and the encoder 1605 and decoder 1606 are to encode and decode the input image signal, and the known art such as discrete cosine transform coding method may be employed. Besides, since the mode control signal m corresponds to the components, it is not particularly necessary to transmit the mode control signal m or record the mode control signal m in a medium. The number of bits of the mode control signal is not limited to two, and only one bit may be enough by setting the two components out of the three components in the same characteristic.

The emphasis circuit and de-emphasis circuit are defined in a complementary relation, but it does not matter particularly if the enhancement degree of the emphasis circuit is set smaller than the suppression degree of the de-emphasis circuit.

The twenty-first embodiment of the invention is described below. The twenty-first embodiment is different from the twentieth embodiment in the mode control signal m generated by the control signal generating circuit 1603 in FIG. 16. The control signal generating circuit 1603 issues a two-bit mode control signal m for distinguishing the frame predict structure in the case of interframe predictive coding, from the clock for sampling the horizontal and vertical synchronizing signal and image signal, into the emphasis circuit 1604 and de-emphasis circuit 1607.

Generally, the frame predict structure for interframe predictive coding is available in I frame for intraframe coding, P frame for one-direction predict coding, and B frame for two-direction predict coding, and by comparing the coding noise of frames, it is known that the coding noise increases in the sequence of I<P<B. Therefore, by distinguishing each frame and increasing the emphasis amount and de-emphasis amount in the sequence of I<P<B, a uniform reproduced image can be obtained in each frame.

Since the mode control signal m corresponds to the frame predict structure, it is not particularly necessary to transmit the mode control signal m or record the mode control signal m into a medium.

Instead of the processing in each frame described above, it is also possible to process in each field or the like in interlaced image, etc. By dividing the picture into blocks composed of plural pixels, when determining the coding process in every block, the mode may be selected in every block.

Besides, as plural coding processes, intraframe coding and interframe coding are explained, but not limited to them, as plural coding processes, transform coding and DPCM coding may be changed over, for example.

The signal enhancement and signal suppression may be in complementary relation, or the enhancement degree may be smaller than the suppression mode in certain mode. For example, in the case of interframe coding method, it may be arranged to select a mode in which the enhancement degree is smaller than the suppression mode. That is, in the case of interframe coding method, the coding noise can be removed efficiently when the assigned coding information quantity is small.

Or, only the enhancement degree may be determined depending on the coding method, and the suppression degree may be constant in this case, the suppression degree may be equal to the greatest enhancement degree.

Figure 17:
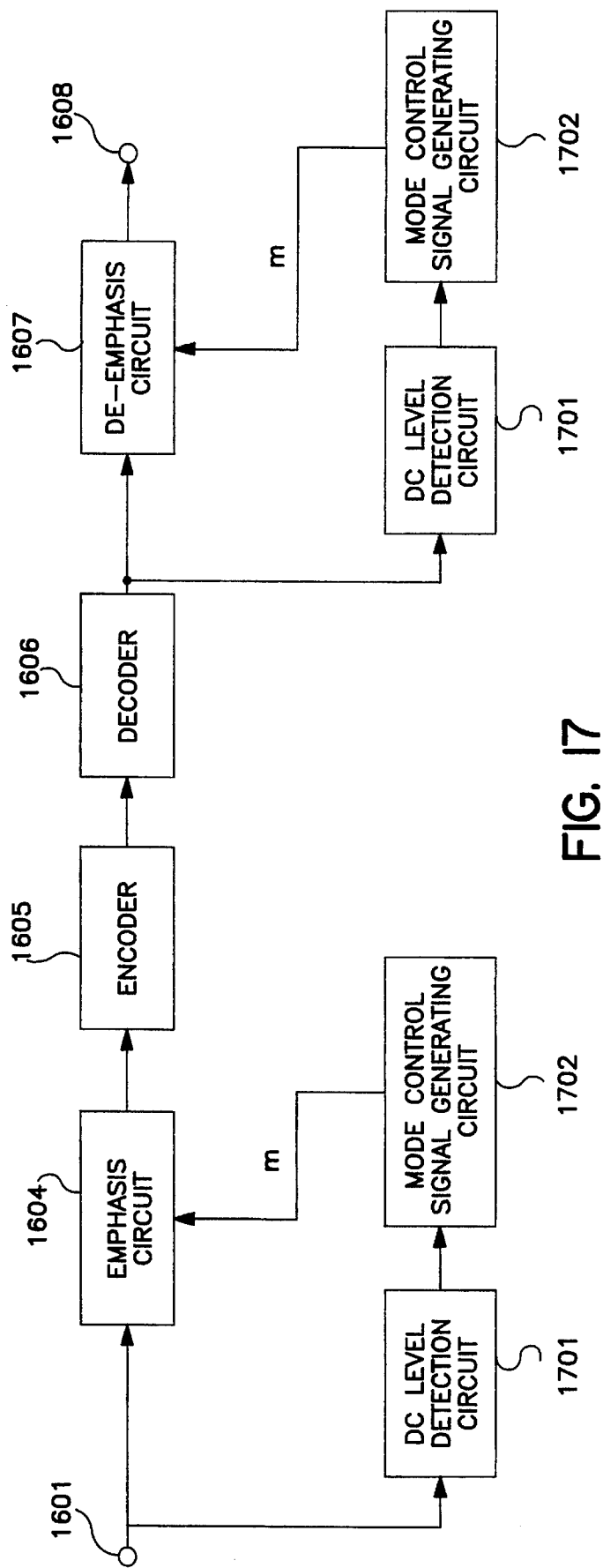
FIG. 17 is a block diagram of a twenty-second embodiment of coding and decoding apparatus of the invention.

A twenty-second embodiment of the invention is described below. FIG. 17 shows the twenty-second embodiment of coding and decoding apparatus of video signal. In FIG. 17, numeral 1701 is a DC level detection circuit, which is composed of an adder, a memory, and a counter. Numeral 1702 is a mode control signal generating circuit, which is composed of a comparator and others. Other blocks are same as in FIG. 16.

The operation is described with reference to FIG. 17. In the input terminal 1601, for example, a digital image signal quantized in eight bits is entered. The DC level detecting circuit 1701 adds the image data values for a specific period of input digital image signal or decoded image signal, for example, for a period of one frame, and detects the DC level by calculating the mean, and issues to the mode control signal generating circuit 1702. The mode control signal generating circuit 1702 compares this DC level with, for example, three values (64, 128, 192), and issues a two-bit mode control signal m for distinguishing the value in any one of the ranges of 0 to 63, 64 to 127, 128 to 191, and 192 to 255, to the emphasis circuit 1604 and the de-emphasis circuit 1607.

When the DC level is a large value close to 255, if a large signal enhancement is conducted by the emphasis circuit 1604, the level of the image signal after enhancement may exceed 255, and probability of overflow is high, or if a large signal enhancement is conducted by the emphasis circuit 1604 when the DC level is a small value close to 0, the level of the image signal after enhancement may be lower than 0, and probability of underflow is high, thereby causing mismatching in de-emphasis, and therefore the emphasis characteristic and de-emphasis characteristic are changed depending on the magnitude of the DC level. The subsequent operation is same as in the twenty-first embodiment, and is hence omitted herein.

As described herein, in the embodiment, by detecting the DC level for a specified period of digital image signal, and controlling so that the enhancement degree and suppression degree may be small when the value is close to 0 level or 255 level, occurrence of overflow and underflow of signal amplitude may be decreased, thereby decreasing mismatch between signal enhancement and signal suppression, and also decreasing noise due to signal enhancement and signal suppression.

In this case, meanwhile, by transmitting the mode control signal m in emphasis or recording in a medium, the reproduction side DC level detection circuit 1701 and mode control signal generating circuit 1702 in FIG. 17 are not needed, and a reproduced image signal of higher precision may be obtained in a smaller circuit scale.

Figure 18:
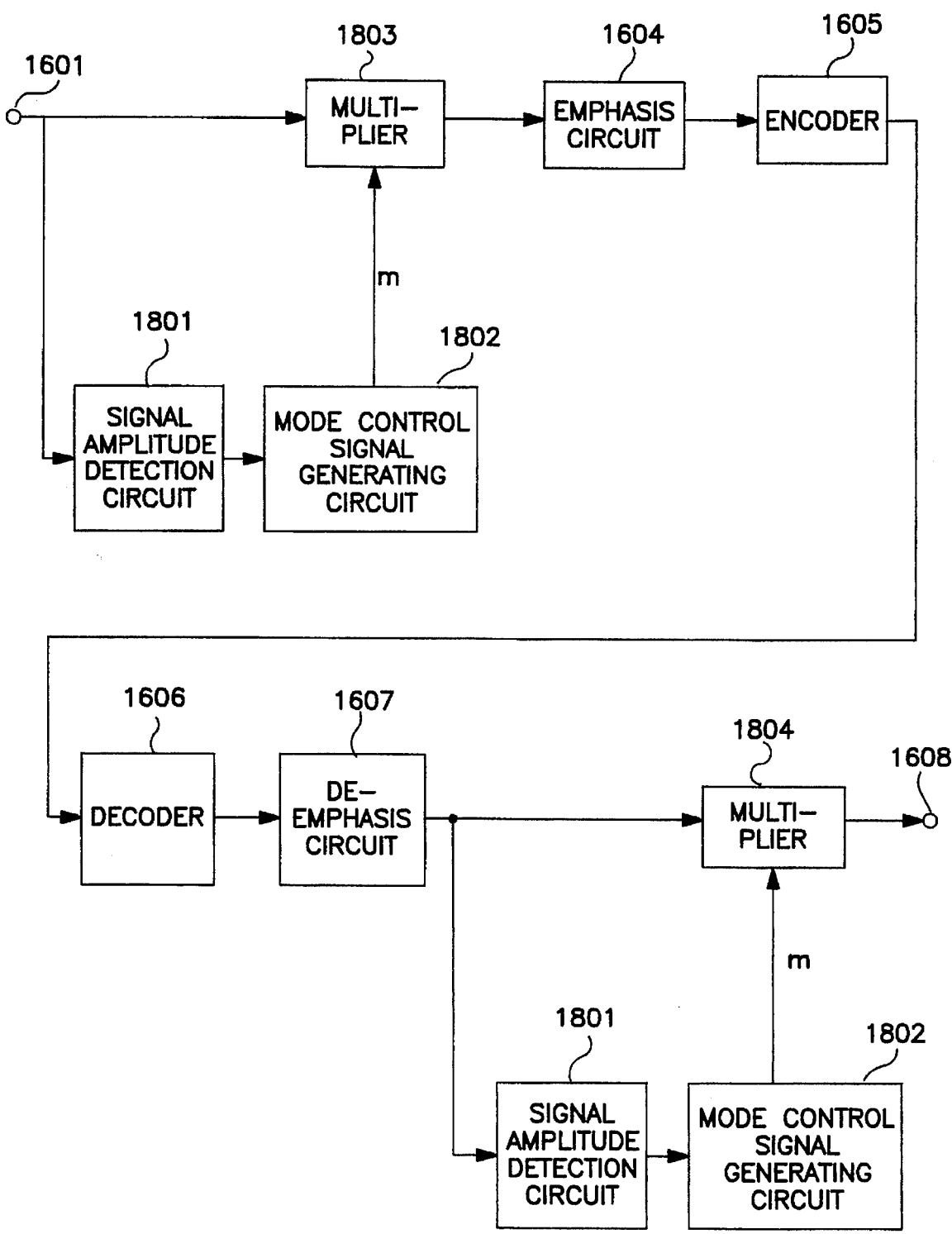
FIG. 18 is a block diagram of a twenty-third embodiment of coding and decoding apparatus of the invention.

A twenty-third embodiment of the invention is described below. FIG. 18 shows the twenty-third embodiment of coding and decoding apparatus of video signal of the invention. In FIG. 18, numeral 1801 is a signal amplitude detecting circuit, 1802 is a mode control signal generating circuit, 1803 is a first multiplier, and 1804 is a second multiplier. Other blocks are same as in FIG. 16.

The operation is described below according to FIG. 18. In the input terminal 1601, a digital video signal is entered, and the signal amplitude detection circuit 1801 detects the signal amplitude of an input video signal for a specific period, and issues its level to the mode control signal generating circuit 1802. The mode control signal generating circuit 1802 issues a mode control signal m to the first multiplier 1803.

On the other hand, the input video signal is multiplied by the first multiplier 1803 of which coefficient of multiplication varies with the mode control signal m issued from the mode control signal generating circuit 1802. The output of the first multiplier 1803 is enhanced in the emphasis circuit 1604, and is issued into the encoder 1605. The encoder 1605 encodes the output of the emphasis circuit 1604, and a code stream is transmitted or recorded in a medium.

This code stream is decoded in the decoder 1606, and the decoded video signal is sent into the de-emphasis circuit 1607. The de-emphasis circuit 1607 suppresses decoded video signal in a complementary characteristic to the emphasis circuit 1604. The output of the de-emphasis circuit 1607 is issued to the signal amplitude detection circuit 1801 and second multiplier 1804. The signal amplitude detection circuit 1801 detects the signal amplitude of the decoded video signal for the specific period, and issues its level into the mode control signal generating circuit 1802.

The mode control signal generating circuit 1802 issues a mode control signal m into the second multiplier 1804. On the other hand, the decoded video signal is multiplied by an inverse number of the coefficient of multiplication of the first multiplier 1803 according to the mode control signal m issued from the mode control signal generating circuit 1802, so that the reproduced video signal is issued to the output terminal 1608.

Usually, the emphasis characteristic can be changed by varying X1, K1 shown in FIG. 2(*a*) and 2(*b*), and the actual hardware is realized by storing the characteristic table in the ROM. According to the constitution of the embodiment, however, with the emphasis and de-emphasis characteristics being fixed, by controlling the amplitude of the input signal by the mode control signal m, the emphasis characteristic can be altered, so that the hardware such as ROM storing the characteristic table is not needed, so that the circuit scale can be reduced.

Incidentally, when the signal amplitude of the video signal entered from the input terminal 1601 is very large, probability of overflow due to emphasis process increases, and noise is generated due to mismatching of emphasis and de-emphasis. At this time, by the constitution of the embodiment, it is controlled to reduce the amplitude of the image signal so that overflow may not occur, and reverse process is done in the case of the signal after de-emphasis, so that the noise can be reduced.

In this case, by transmitting the mode control signal m in emphasis or recording in a medium, the reproduction side signal amplitude detection circuit 1801 and mode control signal generating circuit 1802 in FIG. 18 are not needed, so that the reproduced video signal of higher precision may be obtained in a smaller circuit scale.

Figure 19:
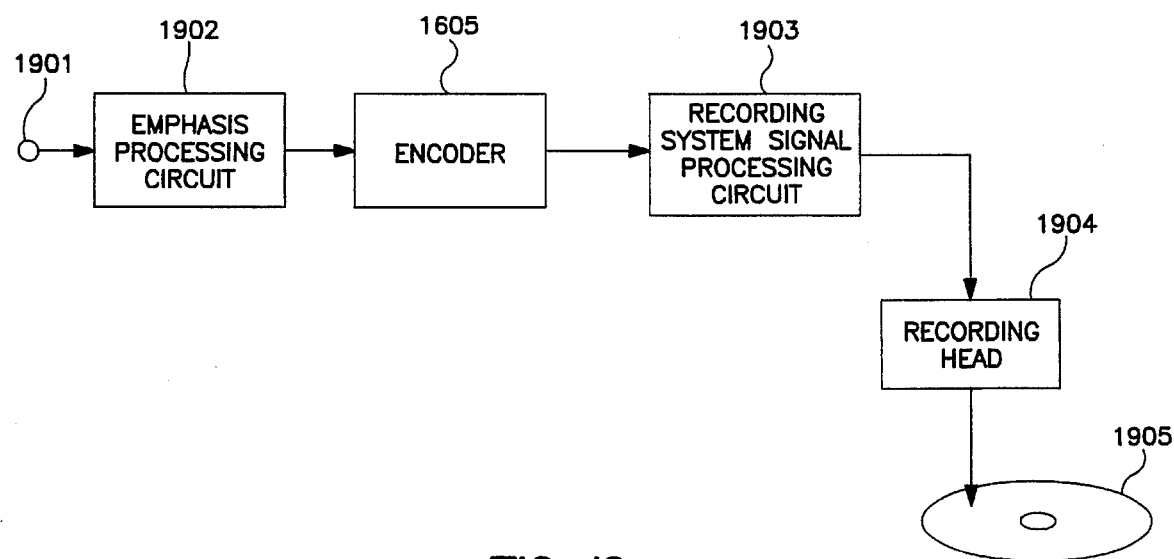
FIG. 19 is a block diagram of a twenty-fourth embodiment of coding and decoding apparatus of the invention.

A twenty-fourth embodiment of the invention is described. FIG. 19 shows an embodiment of an optical disk device for recording the code stream coded by the coding apparatus of video signal of the invention into an optical disk. In FIG. 19, numeral 1902 is an emphasis processing circuit for enhancing the signal in the constitution of the emphasis circuit as described in first to twenty-third embodiments of the invention, 1903 is a recording system signal processing circuit for adding an error correction code to a code stream coded by an encoder 1605, modulating, equalizing, and enhancing, 1904 is a recording head using a laser beam, and 1905 is an optical disk.

The operation of thus constituted embodiment is described below. First, the digital video signal entered from an input terminal 1901 is enhanced by the emphasis process in the emphasis processing circuit 1902 in the constitution described in the first to twenty-third embodiments. The enhanced signal is encoded by the encoder 1605, and a code stream is sent out into the recording system signal processing circuit 1903. The recording system signal processing circuit 1903 adds an error correction code to the code row, modulates digitally, equalizes recording, amplifies, and records a signal in the optical disk 1905 by using the recording head 1904. A recorded optical disk can be used to produce high quality pictures.

In the ninth to twenty-third embodiments of the invention, meanwhile, the mode changing unit is not limited, and the picture unit, unit of plural pictures, or the block unit obtained by dividing a picture into blocks may be used. The emphasis circuit may possess either nonlinear characteristic as in the fourth embodiment or linear characteristic. There may be a mode not performing signal enhancement and signal suppression at all.

The constitution may also comprise a transmitter for sending or recording mode signals together with coded image data, and the reproducing means may comprise means for receiving mode signals. As a result, it is not necessary to select the mode at the reproduction side, so that the circuit scale may be reduced.

The emphasis circuit used in the foregoing embodiments may be any one of the two-dimensional emphasis circuit described in the seventh and eighth embodiments, one-dimensional emphasis, or three-dimensional emphasis including the time direction.

In the embodiments so far, digital video signals are enhanced and suppressed, but analog video signals may be also enhanced and suppressed.

Figure 12:
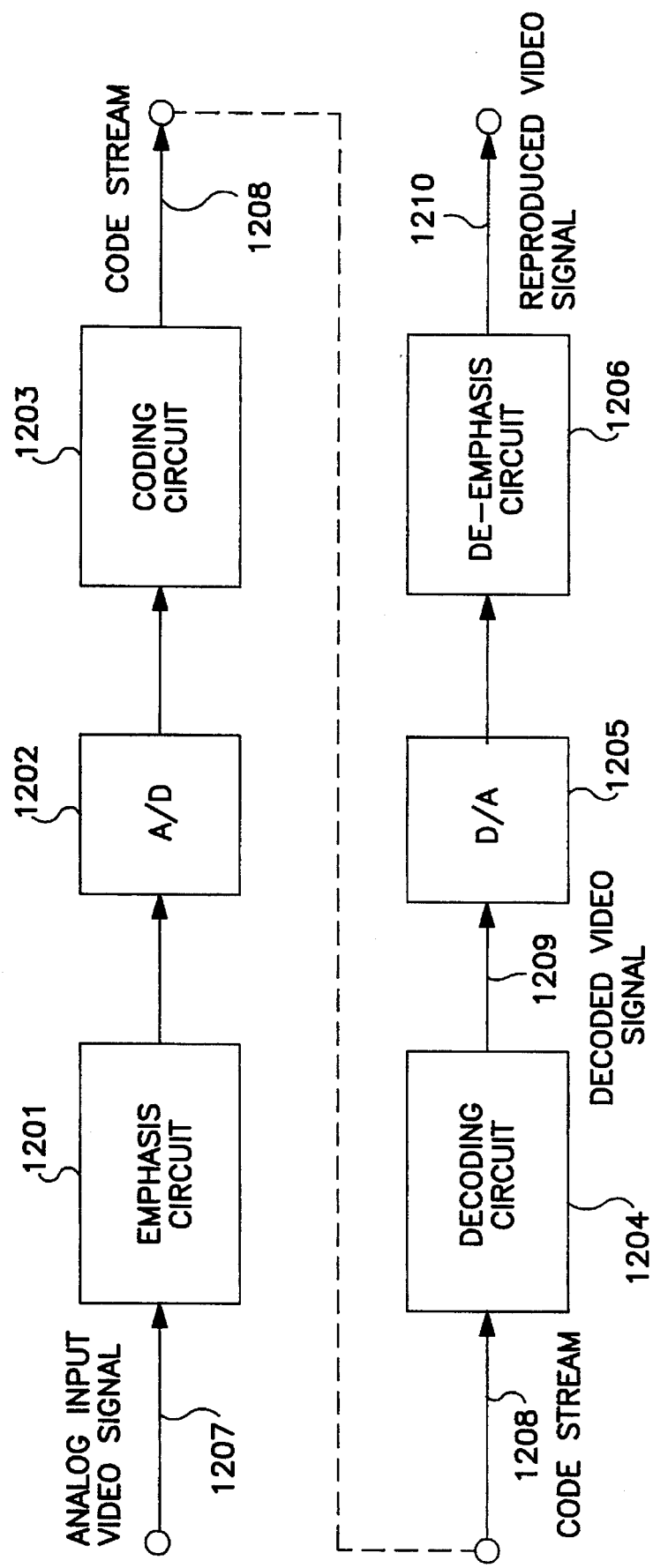
FIG. 12 is a block diagram of a twenty-fifth embodiment of coding and decoding apparatus of the invention.

FIG. 12 shows an example of coding and decoding apparatus for enhancing and suppressing analog video signals as a twenty-fifth embodiment of the invention. FIG. 12 relates to a coding and decoding apparatus comprising an emphasis circuit 1201, an A/D converter 1202, an encoder 1203, a decoder 1204, a D/A converter 1205, and a de-emphasis circuit 1206.

The emphasis circuit 1201 enhances an analog video signal 1207. The enhanced signal is converted into a digital signal in the A/D converter 1202, and is fed into the encoder 1203. The encoder 1203 encodes the input signal, and issues a code stream 1208. The decoder 1204 decodes the code stream 1208, and issues a digital decoded video signal 1209. The digital decoded video signal 1209 is converted into an analog signal by the D/A converter 1205, and is fed into the de-emphasis circuit 1206. The de-emphasis circuit 1206 possesses a complementary characteristic to the emphasis circuit 1201, and suppresses the input signal, and issues an analog reproduced video signal 1210.

By thus constituting the emphasis circuit 1201 and de-emphasis circuit 1206 by analog circuits, it is possible to compose more easily and at a lower cost than to constitute by digital circuits.

The signal enhancement and signal suppression may be of complementary relation, but the enhancement degree may be set smaller than the suppression degree.

In the first to twenty-fourth embodiments, for enhancement and suppression of analog signals, the A/D converting means may be disposed between the signal enhancing means and the coding means as shown in FIG. 12, and the D/A means between the decoding means and the signal suppressing means.

The A/D converting means and D/A converting means are not limited, but any arbitrary means may be used as far as providing the functions for digital conversion and analog conversion.

The foregoing embodiments relate to the coding and decoding apparatus comprising means for compression coding and means for decoding video signals, but the same holds true with a picture coding apparatus comprising only the means for compressing and coding video signals and issuing a code stream, or a picture decoding apparatus comprising only the means for decoding the code stream and issuing a reproduced video signal.

In the coding and decoding apparatus of the invention, the method of coding process and decoding process may be realized by any known method, including the discrete cosine transform coding method.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, wherein the emphasis means comprises:

means for extracting high frequency components from said video signal;

first limiter means for passing an original amplitude when the magnitude of the high frequency components is not more than a first specified level L1, and limiting the output amplitude of L1 when the magnitude of the high frequency components is more than L1;

first multiplying means for multiplying the output signal of the first limiter means by a first coefficient X1; and means for adding the output signal of the first multiplying means to the input signal; and wherein the de-emphasis means comprises:

means for extracting high frequency components of the decoded video signal;

second limiter means for passing respective original amplitudes when the respective magnitudes of the high frequency components of the decoded video signal is not more than a second specified level L2 given in a form of (1+X1)×L1, and limiting the respective output amplitudes to L2 when the magnitude of the respective high frequency components is more than L2;

second multiplying means for multiplying the output signal of the second limiter means by a second coefficient X2; and means for subtracting the output signal of the second multiplying means from the coded video signal.

2. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, wherein the emphasis means possesses a frequency characteristic having a peak near fs/4 wherein fs is sampling frequency, and the de-emphasis means possesses a frequency characteristic having a peak near fs/2.

3. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, further comprising:

means for detecting the amplitude of the video signal for a specific period before enhancing the signal;

means for selecting one of plural types of mode signals depending on the amplitude detected by the detecting means;

first level control means for controlling the amplitude of the video signal by the mode signal selected by the selecting means; and second level control means for controlling the amplitude of the reproduced video signal, after the signal is suppressed in a reverse characteristic of the first level control means.

4. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, wherein the emphasis means comprises:

means for comparing the amplitude of the video signal with a specific amount: and means for enhancing the video signal by a equivalent enhancement degree to the signal suppression degree of the de-emphasis means when the amplitude of the video signal is not more than the specific amount, and enhancing the video signal by a lower enhancement degree than the signal suppression degree of the de-emphasis means when the amplitude of the video signal is more than the specific amount.

5. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, wherein the emphasis means comprises:

vertical emphasis means for enhancing the signal amplitude to a vertical direction of a screen; and horizontal emphasis means for enhancing the signal amplitude by a greater signal enhancement degree than the signal enhancement degree of the vertical emphasis means to a horizontal direction of the screen; and wherein the de-emphasis means comprises:

vertical de-emphasis means for suppressing the signal amplitude to the vertical direction of the screen; and horizontal de-emphasis means for suppressing the signal amplitude by a greater signal suppression degree than the signal suppression degree of the vertical de-emphasis means to the horizontal direction of the screen.

6. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, mode changeover means for issuing a mode signal by selecting one of L modes wherein L is a natural number greater than one:

whereby the emphasis means enhances the signal amplitude by a signal enhancement degree defined by the mode signal, and the de-emphasis means suppresses the signal amplitude by a signal suppression degree of complimentary characteristic to the signal enhancing characteristic of the emphasis means of the greatest enhancement degree among the L modes.

7. A coding and decoding apparatus of claim 6, further comprising:

means for recording or transmitting the mode signal together with the coded video data; and means for reproducing the recorded or transmitted mode signal;

whereby the de-emphasis means suppresses the signal amplitude by a signal suppression degree defined by the mode signal, and the signal suppression degree in each mode signal is set either equal or greater as compared with the corresponding signal suppression degree.

8. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, means for detecting a DC level of video signal for a specific period; and mode changeover means for issuing a mode signal by selecting one of L modes, L being a natural number larger than one, depending on the DC level;

whereby the signal enhancement degree of the emphasis means is defined by the mode signal.

9. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, wherein the video signal contains three component signals; and the coding and decoding apparatus further comprises:

mode changeover means for issuing at least one different mode signal to the component signals S1, S2 and S3;

whereby the signal enhancement degree of the emphasis means is defined by the mode signal.

10. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, wherein the coding means codes at a coding compression rate corresponding to plural compression rate control signals, and comprises mode changeover means for issuing at least one different mode signal to the plural compression rate control signals;

whereby the signal enhancement degree of the emphasis means is defined by the mode signal.

11. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, further comprising:

mode changeover means for issuing different mode signals corresponding to a reloadable recording medium and a play-only recording medium;

whereby the signal enhancement degree of the emphasis means is defined by the mode signal.

12. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, further comprising:

means for detecting a spatial correlation of the video signal for a specific period; and mode changeover means or issuing a mode signal by selecting one mode from L modes wherein L is a natural number greater than one depending on the spatial correlation;

whereby the signal enhancement degree of the emphasis means is defined by the mode signal.

13. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, further comprising:

means for detecting a time correlation of the input signal for a specific period; and mode changeover means for issuing a mode signal by selecting one mode from L modes wherein L is a natural number greater than one depending on the time correlation;

whereby the signal enhancement degree of the emphasis means is defined by the mode signal.

14. A video signal coding and decoding apparatus, comprising:

emphasis means, having a nonlinear characteristic for increasing degree of signal enhancement of said video signal as amplitude of said video signal decreases, and for setting degree of signal enhancement at a desired level and for generating an output signal, coding means for generating a code row by compression coding the output signal from the emphasis means decoding means for decoding the code row and for generating a decoded video signal, and de-emphasis means having a nonlinear characteristic for increasing degree of signal suppression of said decoded video signal as amplitude of said decoded video signal decreases, and for reproducing said video signal by suppressing the decoded video signal, further comprising:

means for detecting an amount of coding distortion generated by said coding means; and mode changeover means for issuing a mode signal by selecting one mode out of L modes wherein L is a natural number greater than one depending on the coding distortion;

whereby the signal enhancement degree of the emphasis means is defined by the mode signal.

15. A video signal coding apparatus comprising:

emphasis means for enhancing said video signal by a specified enhancement degree and outputting an enhanced video signal;

coding means for compression coding and said enhanced video signal to produce a code stream representing a compression coded video signal; and decoding apparatus including de-emphasis means for suppressing said video signal, wherein said specified enhancement degree is smaller than a suppression degree of said de-emphasis means in said decoding apparatus.

16. A video signal coding and decoding apparatus comprising:

emphasis means for enhancing said video signal by a specified enhancement degree and outputting an enhanced video signal;

coding means for compression coding said enhanced video signal to produce a code stream representing a compression coded video signal;

decoding means for decoding said code stream and producing a decoded video signal; and de-emphasis means for producing an output video signal by suppressing said decoded video signal by a suppression degree larger than said specified enhancement degree of said emphasis means.

17. A video signal coding and decoding apparatus comprising:

emphasis means having a nonlinear characteristic of increasing an enhancement degree as amplitude of said video signal decreases, and for enhancing said video signal by said nonlinear characteristic of said enhancement degree, and outputting an enhanced video signal, wherein said nonlinear characteristic of said enhancement degree is settable to a predetermined characteristic;

coding means for compression coding said enhanced video signal to produce a code stream representing a compression coded video signal;

decoding means for decoding said code stream and producing a decoded video signal, and de-emphasis means having a nonlinear characteristic of increasing a suppression degree as amplitude of an input signal decreases, and for suppressing said decoded video signal by said nonlinear characteristic of said suppression degree, and reproducing an output video signal, wherein said de-emphasis means varies suppression degree with respect to said enhancement degree of said emphasis means, and has said suppression degree larger than said enhancement degree of said emphasis means.

18. A video signal reproducing process apparatus comprising:

means for producing a decoded video signal by decoding a code stream representing a compression coded video signal; and de-emphasis means having a nonlinear characteristic of increasing a signal suppression degree as amplitude of said decoded video signal becomes small, and for suppressing said decoded signal in a complementary relation to signal enhancement, or suppressing said decoded signal by a greater suppression degree than a enhancement degree in a signal enhancement, when said code stream is produced by compression coding process after signal enhancement.

19. An optical disk in which a code stream produced by a digital video signal coding and recording apparatus is recorded, wherein said coding and recording apparatus comprises:

emphasis means having a nonlinear characteristic increasing in a signal enhancement degree as amplitude of an input video signal becomes small, and for enhancing said input video signal by said nonlinear characteristic of said signal enhancement degree, and outputting said enhanced video signal;

coding means for compression coding said enhanced video signal to produce said code stream, wherein said code stream represents a compression coded video signal; and laser beam recording means for recording said code stream on said optical disk.

* * * * *